US012709346B2

(12) United States Patent
Hinson et al.

(10) Patent No.: US 12,709,346 B2
(45) Date of Patent: Aug. 18, 2026

(54) OFFROAD VEHICLE WITH MODULAR FRAME

(71) Applicant: RCR Enterprises, LLC, Welcome, NC (US)

(72) Inventors: Benjamin Lynn Hinson, Kannapolic, NC (US); Shannon Craig Mayes, Mooresville, NC (US)

(73) Assignee: RCR ENTERPRISES, LLC, Welcome, NC (US)

( * ) Notice: Subject to any disclaimer, the term of this patent is extended or adjusted under 35 U.S.C. 154(b) by 0 days.

(21) Appl. No.: 19/093,683

(22) Filed: Mar. 28, 2025

(65) Prior Publication Data

US 2025/0304197 A1 Oct. 2, 2025

Related U.S. Application Data

(60) Provisional application No. 63/570,898, filed on Mar. 28, 2024.

(51) Int. Cl.
*B62D 63/02* (2006.01)

(52) U.S. Cl.
CPC .................................. *B62D 63/025* (2013.01)

(58) Field of Classification Search
CPC ....... B62D 24/00; B62D 24/02; B62D 63/025
USPC ............................................. 296/35.1, 183.1
See application file for complete search history.

(56) References Cited

U.S. PATENT DOCUMENTS 3,374,030 A * 3/1968 Brisebois .................. B60P 7/13 414/373
3,550,969 A * 12/1970 Robinson ................ F16B 2/065 403/392
3,756,327 A * 9/1973 Orthman ................ A01B 35/22 403/385
4,032,245 A * 6/1977 Woodruff ................ F16B 2/065 403/385
4,243,104 A * 1/1981 Sipos ..................... A01B 13/08 172/178
4,456,414 A * 6/1984 Williams .................. B60P 1/64 403/375
4,786,204 A * 11/1988 Mayeda ................. A01B 15/00 172/744
5,203,670 A * 4/1993 Yoneda .................. B65D 90/18 414/498
5,257,848 A * 11/1993 Coletti ..................... B60J 10/00 296/156
6,298,629 B1 * 10/2001 Ador .................. A62B 35/0068 248/220.21
6,390,742 B1 * 5/2002 Breeden ............. B65D 90/0013 410/82

(Continued)

*Primary Examiner* — Jason D Shanske
*Assistant Examiner* — Shams Dhanani
(74) *Attorney, Agent, or Firm* — Moore & Van Allen PLLC

(57) ABSTRACT

A vehicle, and in particular an offroad vehicle, with improved capabilities. The vehicle provides improved performance (e.g., ground clearance, deployment options, or the like), allows for customization for different types of vehicles (e.g., frame allows for the connection of different types of components for different applications, improved assembly, and/or maintenance), and/or allows for modular interchangeability of vehicle beds in the field for changing situations (e.g., different beds may be interchanged for different operational purposes).

16 Claims, 32 Drawing Sheets

(56) References Cited

U.S. PATENT DOCUMENTS

| | | | | |
|---|---|---|---|---|
| 6,568,892 | B2 * | 5/2003 | Landoll | B60P 1/6454 414/494 |
| 6,672,018 | B2 * | 1/2004 | Shingleton | F24S 25/636 126/621 |
| 6,682,280 | B1 * | 1/2004 | Lindsay | B62D 61/10 410/100 |
| 6,932,297 | B1 * | 8/2005 | Steindl | B64D 11/02 248/680 |
| 7,950,729 | B2 * | 5/2011 | Gerke | B62D 65/04 296/193.07 |
| 9,894,822 | B2 * | 2/2018 | Beeck | A01B 21/086 |
| 10,160,497 | B2 * | 12/2018 | Wimpfheimer | B60G 3/20 |
| 10,207,757 | B2 * | 2/2019 | Scaringe | G06Q 30/0645 |
| 10,556,622 | B1 * | 2/2020 | Calliari | B62D 21/02 |
| 10,894,593 | B2 * | 1/2021 | Benson | B64U 50/13 |
| 11,213,704 | B2 * | 1/2022 | Smith | A62B 35/0068 |
| 11,292,327 | B2 * | 4/2022 | Deckard | B60K 17/348 |
| 11,970,229 | B1 * | 4/2024 | Lee | B60L 50/50 |
| 12,134,426 | B1 * | 11/2024 | Pinsonneault | B62D 25/20 |
| 12,415,394 | B2 * | 9/2025 | Hansen | B60G 7/005 |
| 2001/0035664 | A1 * | 11/2001 | Steffens | B60J 7/141 296/100.09 |
| 2003/0037967 | A1 * | 2/2003 | Chernoff | B60G 13/14 180/65.1 |
| 2003/0168844 | A1 * | 9/2003 | Borroni-Bird | B60T 8/00 280/784 |
| 2006/0091718 | A1 * | 5/2006 | Thomas | B60P 1/28 298/17.7 |
| 2008/0017426 | A1 * | 1/2008 | Walters | B60F 3/003 296/193.04 |
| 2012/0153592 | A1 * | 6/2012 | Mielke | B60G 3/04 280/124.134 |
| 2014/0027483 | A1 * | 1/2014 | Bonner | B60P 7/14 224/403 |
| 2014/0232080 | A1 * | 8/2014 | Karel | B60G 17/018 280/86.5 |
| 2015/0028068 | A1 * | 1/2015 | Fontenot | B62D 61/12 29/402.09 |
| 2016/0332676 | A1 * | 11/2016 | Miller | B60G 3/20 |
| 2016/0339960 | A1 * | 11/2016 | Leonard | B62D 61/10 |
| 2017/0008359 | A1 * | 1/2017 | Wolf-Monheim | B60G 3/10 |
| 2018/0281722 | A1 * | 10/2018 | Stuber | E02F 9/163 |
| 2018/0281861 | A1 * | 10/2018 | Gordon | B62D 7/166 |
| 2020/0055360 | A1 * | 2/2020 | Berlingieri | B60G 17/015 |
| 2020/0070743 | A1 * | 3/2020 | Williams | F16J 15/022 |
| 2020/0346542 | A1 * | 11/2020 | Rasa | B62D 27/023 |
| 2022/0234663 | A1 * | 7/2022 | Gordon | B60G 3/20 |
| 2023/0339541 | A1 * | 10/2023 | Nysse | B62D 65/024 |
| 2025/0065679 | A1 * | 2/2025 | LaTarte | B60G 13/005 |
| 2025/0074523 | A1 * | 3/2025 | Park | B60G 13/005 |
| 2025/0304197 | A1 * | 10/2025 | Hinson | B62D 33/02 |

* cited by examiner

REMOVING AN EXISTING VEHICLE BED FROM THE FRAME, WHEREIN REMOVING THE EXISTING BED FROM THE FRAME COMPRISES DECOUPLING THE EXISTING BED FROM THE FRAME VIA DECOUPLING THE EXTENSION CONNECTOR FROM THE RECEIVING CONNECTOR
1002

REMOVING THE BED FROM THE FRAME, SUCH AS BY LIFTING THE BED (VERTICALLY) AND MOVING THE BED AND/OR VEHICLE (HORIZONTALLY). THE BED MAY BE LIFTED AND/OR MOVED (E.G., MANUALLY BY ONE OR MORE USERS IN THE FIELD, OR PARTIALLY AUTOMATICALLY THROUGH ONE OR MORE JACKS)
1004

INSTALLING AN ALTERNATE BED TO THE FRAME WHEREIN THE RECEIVING CONNECTOR RECEIVES AT LEAST A PORTION OF THE EXTENSION CONNECTOR
1006

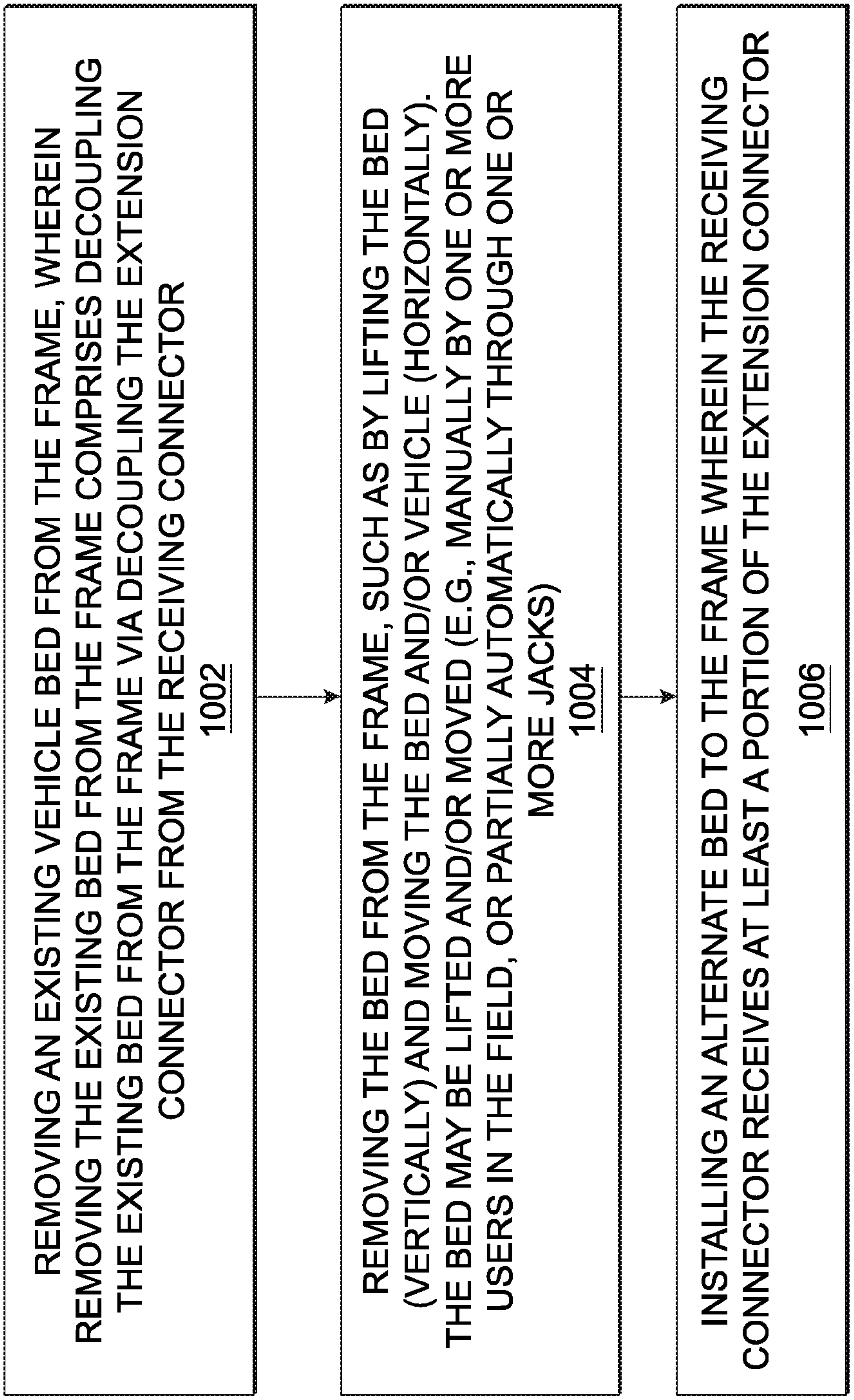

FIG. 27

OFFROAD VEHICLE WITH MODULAR FRAME

PRIORITY CLAIM

This application claims the benefit of priority to U.S. Provisional Patent Application No. 63/570,898, filed on Mar. 28, 2024, the entirety of which is incorporated by reference herein.

STATEMENT OF GOVERNMENT INTEREST

This invention was made with government support under the H9245323P0045 contract awarded by USSOCOM Regional Contracting Office. The government has certain rights in the invention.

FIELD

The present invention relates to a vehicle, and in particular, an offroad vehicle with improved capabilities for performance standards, customization, and/or modular interchangeability.

BACKGROUND

Offroad vehicles may include a variety of vehicles designed to function on both constructed paths (e.g., paved, or other constructed paths), as well as off of constructed paths in various terrains. Offroad vehicles may typically be limited for specific applications. There is a need for offroad vehicles that have improved capabilities.

BRIEF SUMMARY

As will be described herein, a vehicle is provided, and in particular, an offroad vehicle that may travel on constructed paths and/or on offroad terrain. In some embodiments, the offroad vehicle includes a frame, a plurality of suspension systems operatively coupled to the frame through mounts; a plurality of tire assemblies, wherein a tire assembly is operatively coupled to a suspension system; a propulsion system operatively coupled to one or more tire assemblies; a cab operatively coupled to the frame; and one or more beds operatively coupled to the frame.

In some embodiments, the suspension system may include a lower control arm, wherein the lower control arm is operatively coupled to a tire assembly and the frame, wherein the lower control arm is configured to lift the offroad vehicle above a surface by a lift height.

In some embodiments, the lower control arm may include a primary arm member, and an offset arm member operatively coupled to the primary arm member and operatively coupled to the tire assembly, wherein the offset arm member provides additional lift for the lift height.

In some embodiments, the primary arm member and the offset arm member form an approximately L-shaped lower control arm.

In some embodiments, the lower control arm may include a clearance channel, wherein the clearance channel allows a rotating member or a rotating member housing operatively coupled to the tire assembly to operate without interference from the lower control arm.

In some embodiments, the frame may include one or more axial frame members.

In some embodiments, the one or more axial frame members may include at least two axial frame members operatively coupled by one or more transverse frame members or the cab.

In some embodiments, the one or more axial frame members may include one or more interior surfaces and one or more exterior surfaces. In some embodiments, the one or more interior surfaces form one or more recesses relative to the one or more exterior surfaces. In some embodiments, the mounts comprise a mounting bracket that is operatively coupled to the one or more interior surfaces within the one or more recesses.

In some embodiments, the mounting bracket operatively coupled to the one or more interior surfaces within the one or more recesses reduces the width of the vehicle.

In some embodiments, the frame may further include a plurality of component mounting apertures extending longitudinally along the one or more axial frame members, wherein the component mounting apertures are configured to provide alternate mounting locations for vehicle components.

In some embodiments, a bed connector system including one or more self-locating connectors, wherein the self-locating connectors are configured to operatively couple the one or more beds to the frame.

In some embodiments, the one or more self-locating connectors may further include an extension connector operatively coupled to the frame or the one or more beds, and a receiving connector operatively coupled to the other of the frame or the one or more beds. In some embodiments, the receiving connector may be configured to be operatively coupled to the extension connector.

In some embodiments, the extension connector may include a connector projection, wherein the receiving connector has surfaces forming a connector aperture, and wherein the connector aperture receives the projection of the extension connector.

In some embodiments, the one or more beds may include a plurality of interchangeable modular beds.

In some embodiments, the plurality of interchangeable modular beds may include a flatbed module, a fluid tank supply module, a seated transport module, a truck bed module, a medical assistance module, or a weapons module.

In some embodiments, the propulsion system may include a powertrain comprising an engine, a transmission, and drive shafts.

In another embodiments, a method for interchanging a bed of a vehicle, the vehicle including a frame, wherein the frame includes one or more self-locating connectors, wherein the self-locating connectors include an extension connector operatively coupled to the frame or the bed and a receiving connector operatively coupled to the other of the bed or the frame opposite the extension connector. In some embodiments, the method may include removing an existing bed from the frame, wherein removing the existing bed from the frame includes decoupling the extension connector from the receiving connector. In some embodiments, the method may include installing an alternate bed to the frame.

In some embodiments, the extension connector may include a projection and the receiving connector may include surfaces that form a connector aperture, wherein installing the alternate bed through the one or more self-locating connectors may include receiving the projection of the extension connector within the connector aperture of the receiving connector.

In some embodiments, the existing bed may be removed or the alternate bed may be installed through the use of one or more bed support assemblies.

In yet another embodiment, a modular bed connector system for a vehicle may include an extension connector operatively coupled to a frame or a bed. In some embodiments, the modular bed connector system may include a receiving connector operatively coupled to the other of the frame or the bed. In some embodiments, the modular bed connector system may include a self-locating mechanism including a projection on the extension connector, and the receiving connector including surfaces forming a connector aperture. In some embodiments the projection is configured to be received within the connector aperture to facilitate alignment of the bed to the frame during installation. In some embodiments, the modular bed connector system may include one or more connector bolts configured to provide a force that secures the bed to the frame.

To the accomplishment of the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate embodiments of the invention and which are not necessarily drawn to scale, wherein:

FIG. 27 is a method for interchanging the bed from the frame, in accordance with some embodiments of the present disclosure;

DETAILED DESCRIPTION

Figure 1:
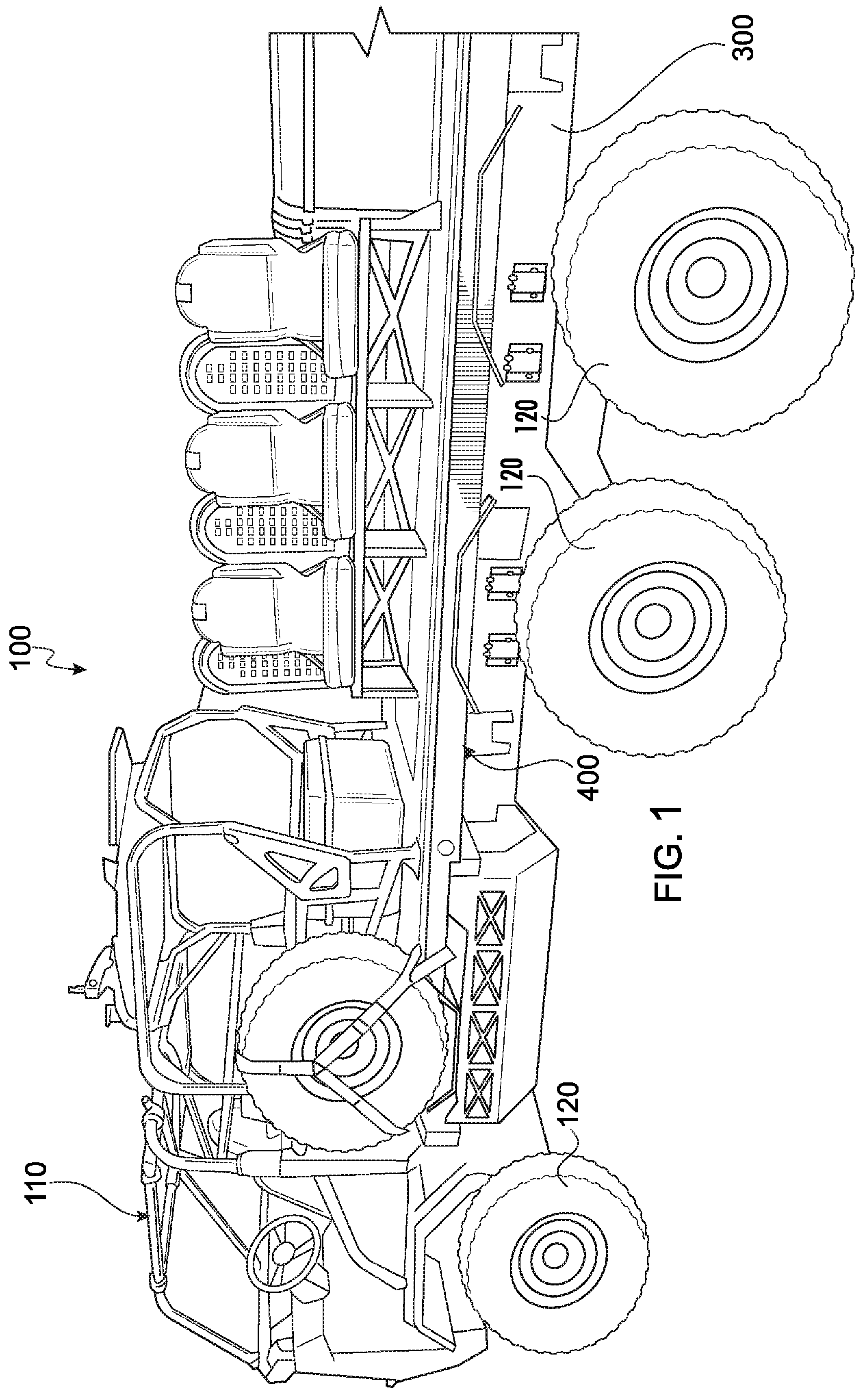
FIG. 1 is a perspective side view of an offroad vehicle, in accordance with some embodiments of the present disclosure.

The following detailed description teaches specific example embodiments of the invention. Other embodiments do not depart from the scope of the present invention. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including" when used herein, specify the presence of stated features, steps, operations, elements, and/or components, but do not preclude the presence or addition of one or more other features, steps, operations, elements, components, and/or groups thereof.

The invention of the present disclosure generally relates to improvements to vehicles, and in particular, improvements to offroad vehicles. As such, while the vehicle of the present disclosure is generally described as being utilized in offroad vehicles, the disclosure described herein may be utilized on any type of vehicle. As will be described with respect to FIGS. 1 through 26, the offroad vehicle 100 may include a frame 300 (otherwise described as the chassis), a plurality of suspension systems 130 operatively coupled to the frame 300 (e.g., through mounting brackets 332), a plurality of tire assemblies 120 (e.g., tire, rim, rotor, brake, pad, or the like) operatively coupled to the suspension system 130, a propulsion system 140 (e.g., a powertrain including an engine and a transmission, electric motors and batteries, combinations thereof, or the like) operatively coupled to the plurality of tire assemblies, a cab 110 operatively coupled to the frame 300, and one or more beds 400 operatively coupled to the frame 300. The frame 300 along with the propulsion system 140 (e.g., the running gear, such as the engine, transmission, drive shaft, differentials, or the like) and the suspension system 130 may be described as the rolling chassis.

In some embodiments, the vehicle may include one or more suspension system(s) operatively coupled to the frame (e.g., through mounting brackets), a propulsion system (e.g., including an engine, a transmission, drive shafts, differentials, or the like), tire assemblies operatively coupled to the suspension system(s) and/or propulsion system, a cab operatively coupled to the frame, and one or more beds operatively coupled to the frame. The present disclose provides improvements to vehicles, and in particular offroad vehicles, to improve the capabilities of such vehicles. In particular, the vehicle of the present disclosure provides improved performance (e.g., ground clearance, deployment options, or the like), allows for customization for different types of vehicles (e.g., frame allows for the connection of different types of components for different applications, improved assembly, and/or maintenance), and/or allows for modular interchangeability in the field for changing situations (e.g., different beds may be easily interchanged for different operational purposes).

In some embodiments, as illustrated in FIGS. 3 through 7, the frame 300 may include one or more axial frame members 310 (e.g., a first axial frame member 312, a second axial frame member 314, or the like). The axial frame members 310 may extend longitudinally along at least a portion of the length of the vehicle (e.g., in some embodiments along the entire length of the vehicle). Further, in some embodiments, the axial frame members 310 may provide the primary structural support and serve as a foundation for mounting various vehicle components, including the suspension system 130, propulsion system 140, modular bed(s) 400, or the like. Further, the two or more axial frame members 310 may be substantially parallel to each other. As used herein, "substantially parallel" may refer to the axial frame members 310 being nearly parallel to each other while not being absolutely parallel, and may include deviations from absolute parallelism. Further, "substantially parallel" may include, but is not limited to, absolute parallelism. Furthermore, the axial frame members 310 may or may not be completely linear, that is, the axial frame members 310 may have one or more bends along the axial frame members 310.

In some embodiments, the axial frame members 310 may be constructed from high-strength materials including but not limited to aluminum alloys, high-strength steel, titanium, composite materials (e.g., advanced composite materials, or the like), or the like. In some embodiments, the material choice may depend on the intended application of the vehicle, which may include factors such as deployment locations. Further, in some embodiments, the axial frame members 310 may include reinforced cross-sections, such as C-channels, I-beams, tubular structures, box frames, or the like, to enhance load-bearing capacity and improve impact resistance.

Figure 3:
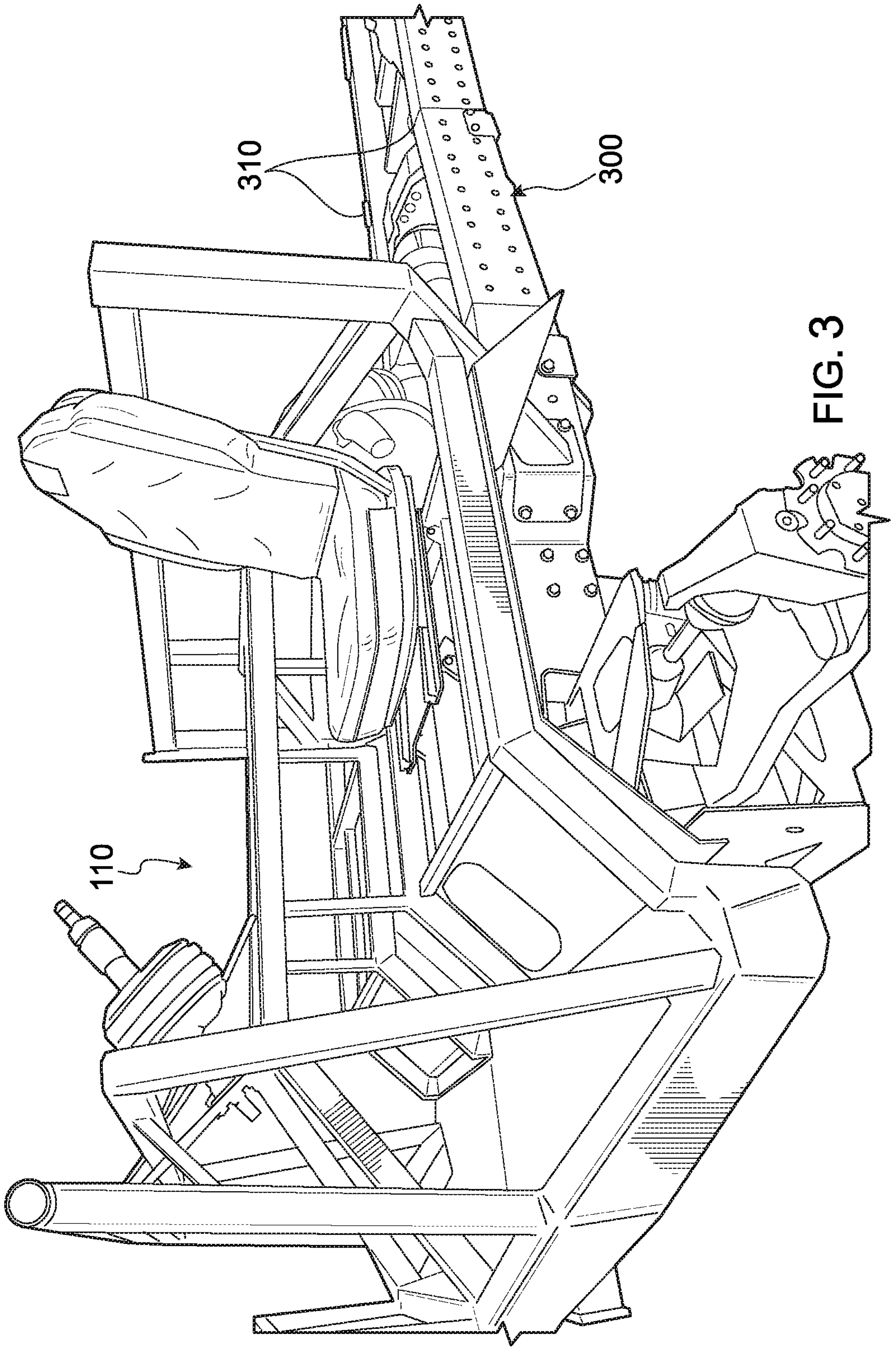
FIG. 3 is a perspective front-side view of a frame of the offroad vehicle, in accordance with some embodiments of the present disclosure.
Figure 4:
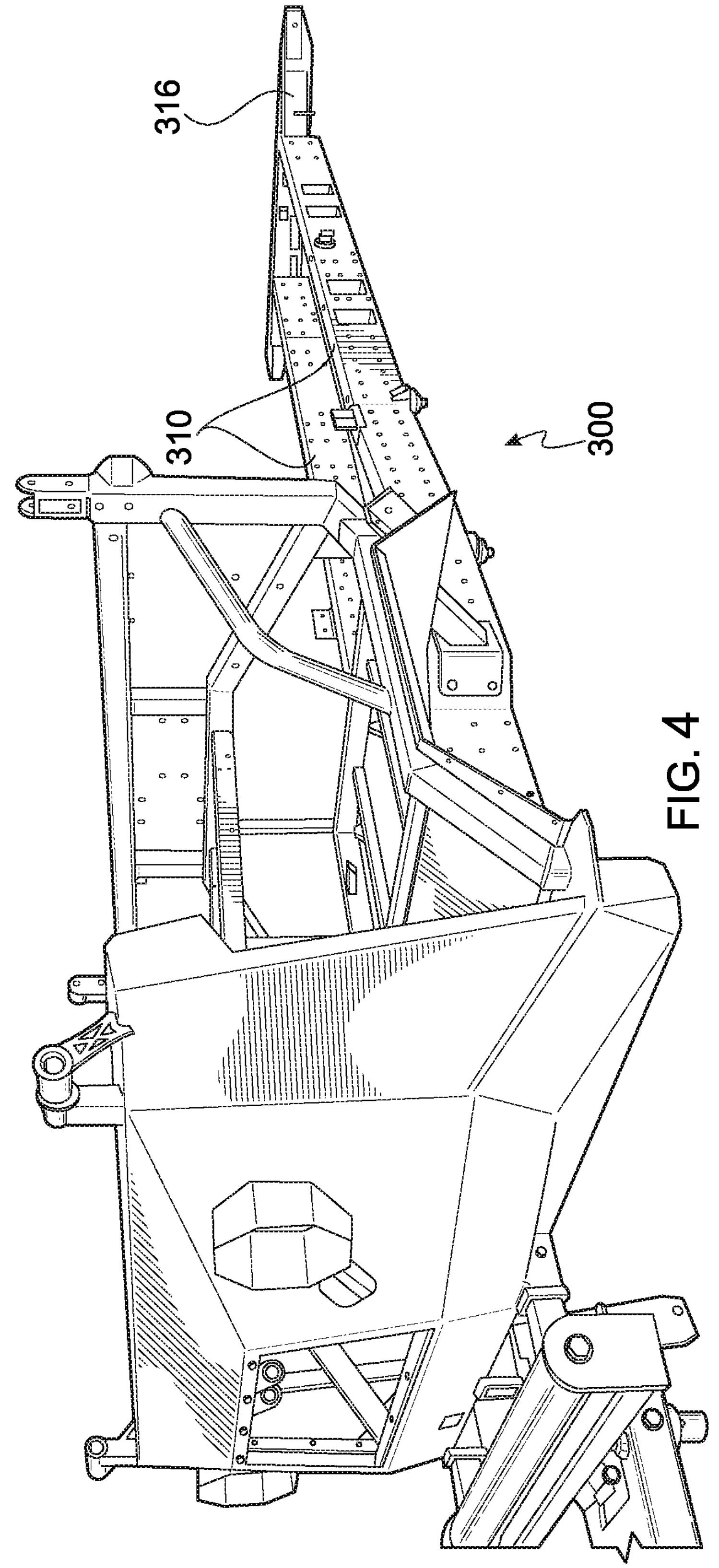
FIG. 4 is a perspective front-side view of the frame, in accordance with some embodiments of the present disclosure.
Figure 5:
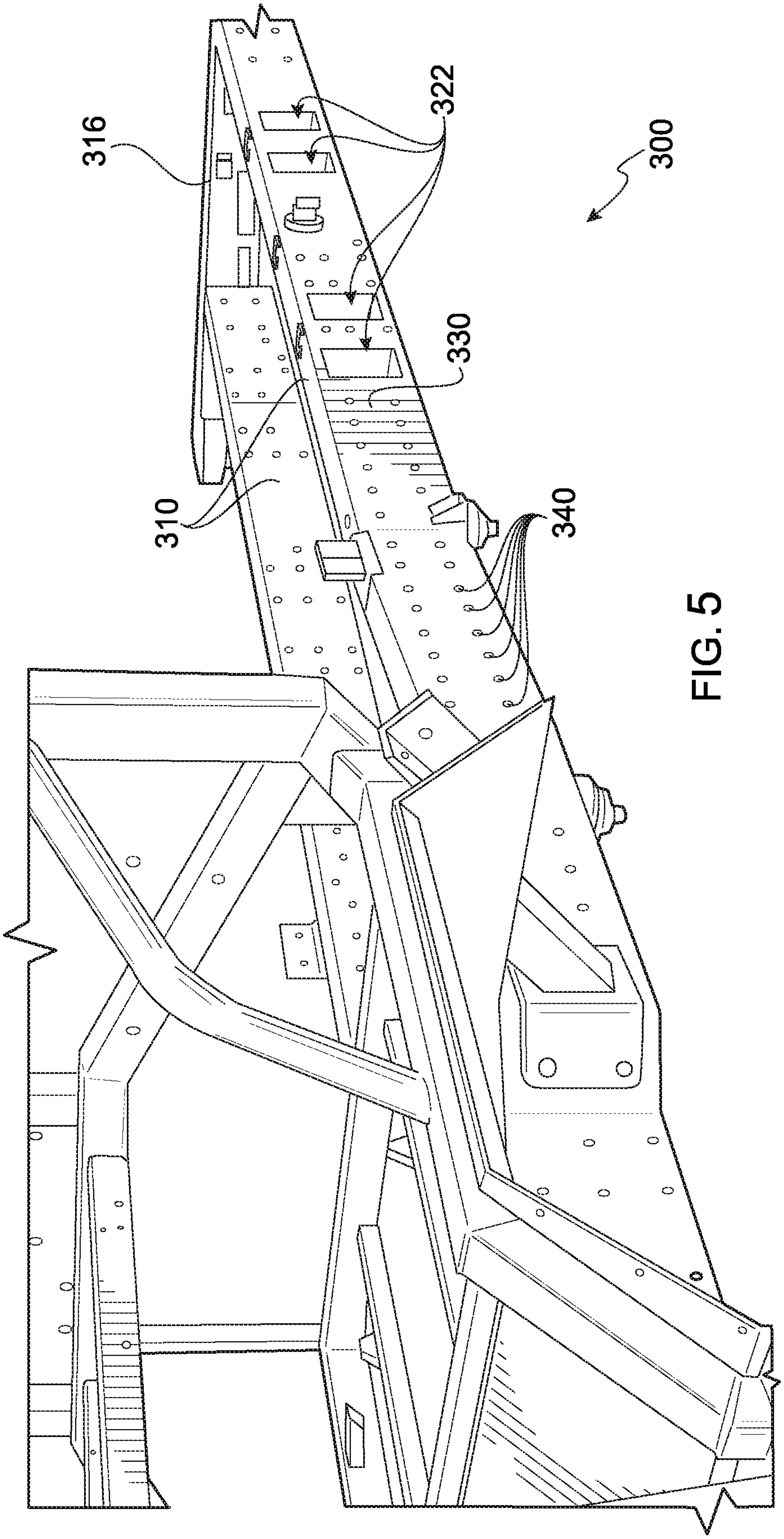
FIG. 5 is an enlarged perspective front-side view of the frame, in accordance with some embodiments of the present disclosure.
Figure 6:
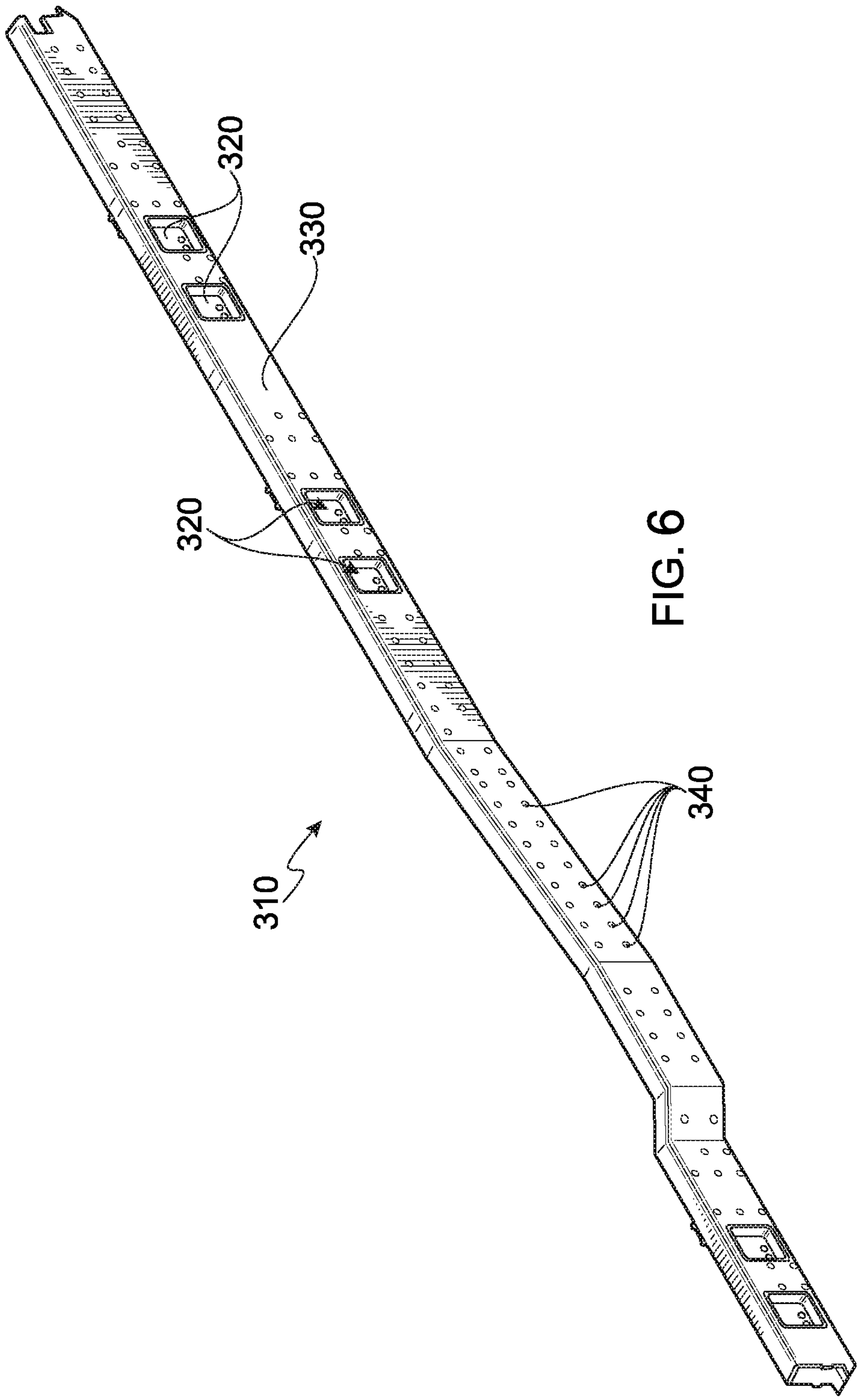
FIG. 6 is a perspective external front-side view of an axial frame member, in accordance with some embodiments of the present disclosure.
Figure 7:
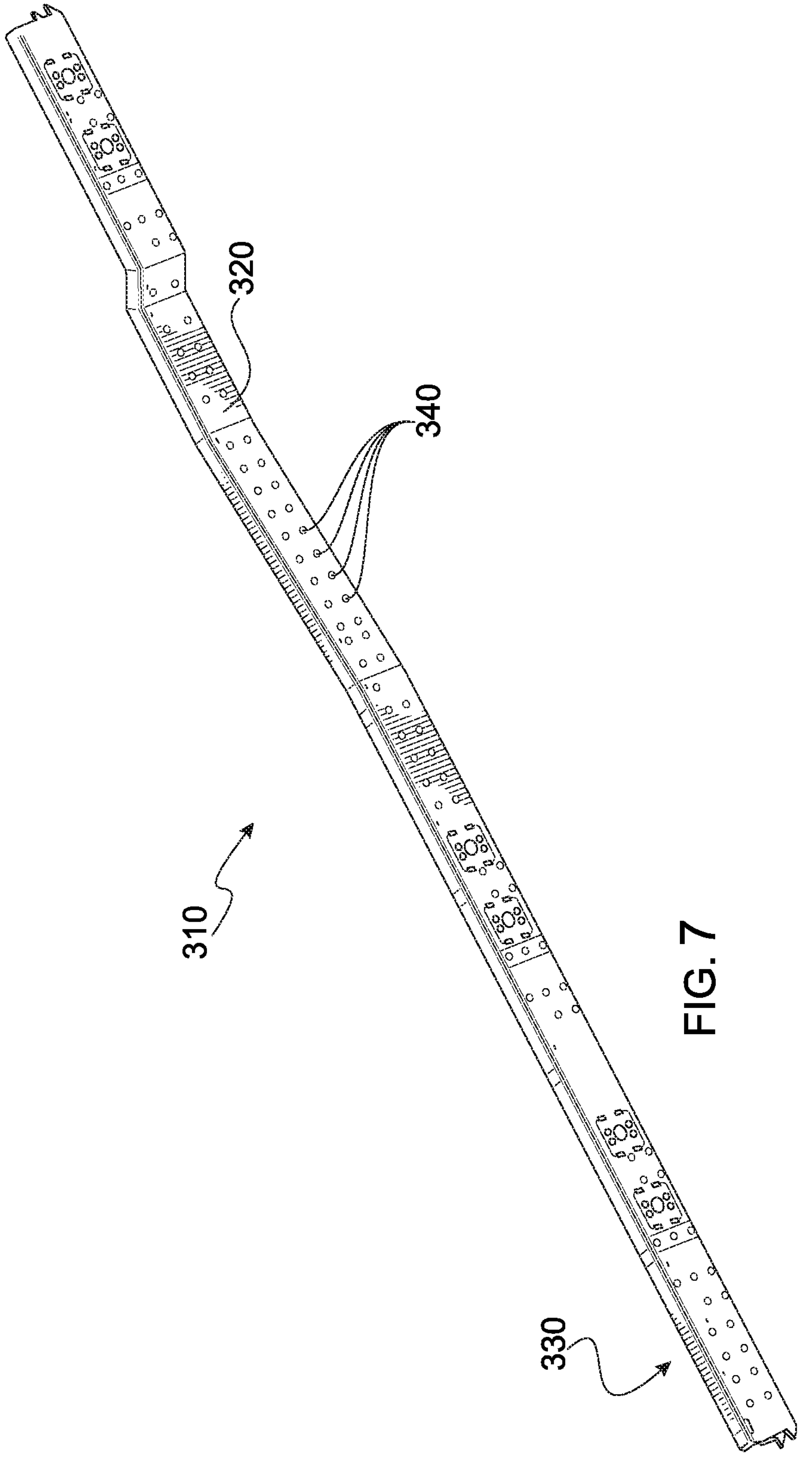
FIG. 7 is a perspective internal rear-side view of the axial frame member, in accordance with some embodiments of the present disclosure.

In some embodiments, the axial frame members 310 may include at least two axial frame members operatively coupled by one or more transverse frame members 316 or the cab. For example, the frame 300 may include at least two axial frame members 310 (e.g., a first axial frame member 312, a second axial frame member 314, or the like) operatively coupled by one or more transverse frame members 316 and/or the cab 110 (e.g., directly or indirectly), as shown in FIGS. 3 through 5. The one or more transverse frame members 316 may be oriented substantially perpendicular to the axial frame members 310. In some embodiments, the orientation of the transverse frame members 316 may provide torsional rigidity, reduce flex under load, and enhance overall vehicle stability. As used herein, "substantially perpendicular" may refer to the transverse frame members 312 being nearly perpendicular to the axial frame members 310 while not being absolutely perpendicular and may include deviations from absolute perpendicularity. Further, "substantially perpendicular" may include, but is not limited to, absolute perpendicularity. Furthermore, the transverse frame members 310 may or may not be completely linear, that is, the transverse frame members 316 may have one or more bends along the transverse frame members 310.

In some embodiments, the one or more axial frame members 310 may include one or more interior surfaces 320 (e.g., along a continuous length of an axial frame member 310, a portion of the length of an axial frame member 316, and/or discontinuous interior surfaces 320, or the like) and one or more exterior surfaces 330. In some embodiments, the one or more exterior surfaces 330 may form the outer surfaces of the axial frame members 310. In some embodiments, the one or more interior surface 320 may form one or more recesses relative to the one or more exterior surfaces 330. As such, the recesses 322 formed by the frame 300 may be used for operative coupling of the one or more suspension systems 130, such as through the use of one or more mounts (e.g., mounting brackets 332, which may be removeable). For example, the mounts (e.g., the mounting brackets 332) may be operatively coupled to the one or more interior surfaces 320 within a recess 322 in order to support the upper control arm 250 of a suspension system 130. In some embodiments, the mounting brackets 332 may be removable, repositionable, and/or interchangeable.

Figure 9:
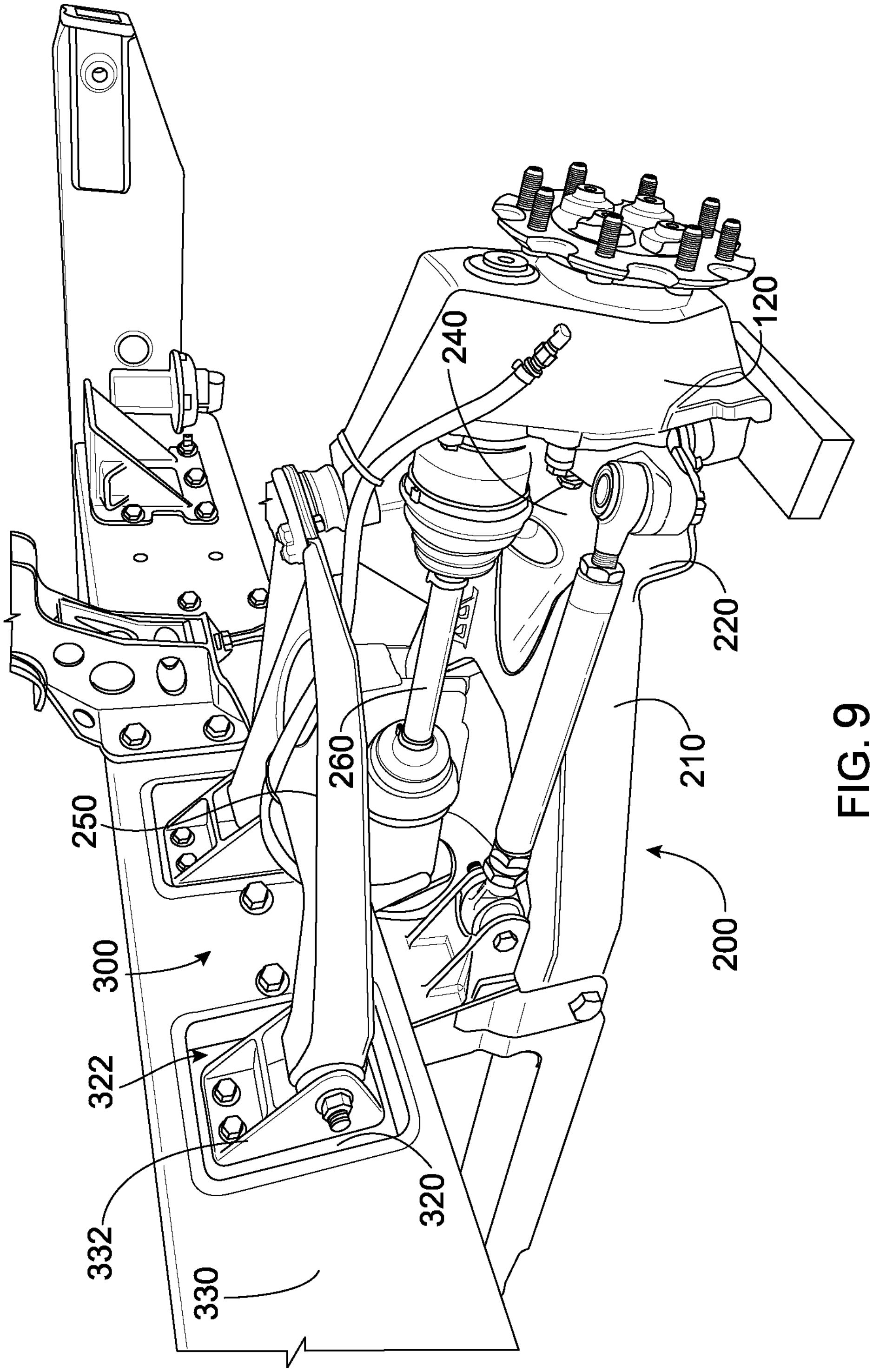
FIG. 9 is a perspective front-side view of the suspension system with the lower control arm operatively coupled to the frame, in accordance with some embodiments of the present disclosure.

As shown in FIG. 9, the one or more mounting brackets 332 may be coupled to the interior surface 320 within the recess 322, which provides various benefits for mounting the suspension systems 130. As will be described in further detail with respect to the plurality of suspension systems 130, this configuration may be used to mount the tire assembly 120 to the frame 300 via the lower control arm 200. In some embodiments, the mounting bracket operatively coupled to the interior surfaces within the recess reduces the width of the vehicle. In this way, using the interior surface 320 as a mounting location for the mounting brackets 332 of the upper control arm 250 may reduce the width of the vehicle 100 by reducing the width of the wheelbase (e.g., the width of the tire assemblies 120 on either side of the vehicle 100). By reducing the width of the vehicle 100, the vehicle 100 may fit within aircraft or ground transport (e.g., trucks, trains, or the like) for improved deployment options, while still providing the desired ground clearance and/or camber gain. For example, this configuration may meet the requirements defined in specifications (e.g., MIL-STD 209K, or the like specifications), contracts, or the like, as written by commercial customers, government entities, regulatory entities, or the like at the time of this filing and/or as amended from time to time in the future. In this regard, the configuration may reduce the need for disassembly prior to transport, reducing mission preparation time and logistical complexity. In addition, the ability of the vehicle 100 to fit within ground transport vehicles enhances strategic deployment flexibility. Additionally, or alternatively, in some embodiments, the recessed mounting configuration may still ensure the vehicle 100 maintains the necessary ground clearance, suspension maneuverability, and the like for offroad mobility.

In some embodiments, the frame 300 may include a plurality of component mounting apertures 340 extending longitudinally along the one or more axial frame members 310, wherein the component mounting apertures 340 are configured to provide alternate mounting locations for vehicle components. As shown in FIGS. 3 through 7, the component mounting apertures 340 may be on an exterior surface 330 of the axial frame members 310 and extend through to an opposing exterior surface 330, extend through an interior surface 320 to the exterior surface 330, or the like. In this way, the component mounting apertures 340 may be quickly accessed by operators, technicians, mechanics, personnel, or the like. Moreover, the component mounting apertures 340 may be used to mount different types of components to the frame 300, such that the frame 300 may be used to assemble different components having different configurations for customization the vehicle for different applications. Further, the component mounting apertures 340 may be used for component storage (e.g., spare components storage, or the like). Consequently, the component mounting apertures 340 provide customization of the vehicle 100 for different applications and/or for the use of different replacement components.

Figure 12:
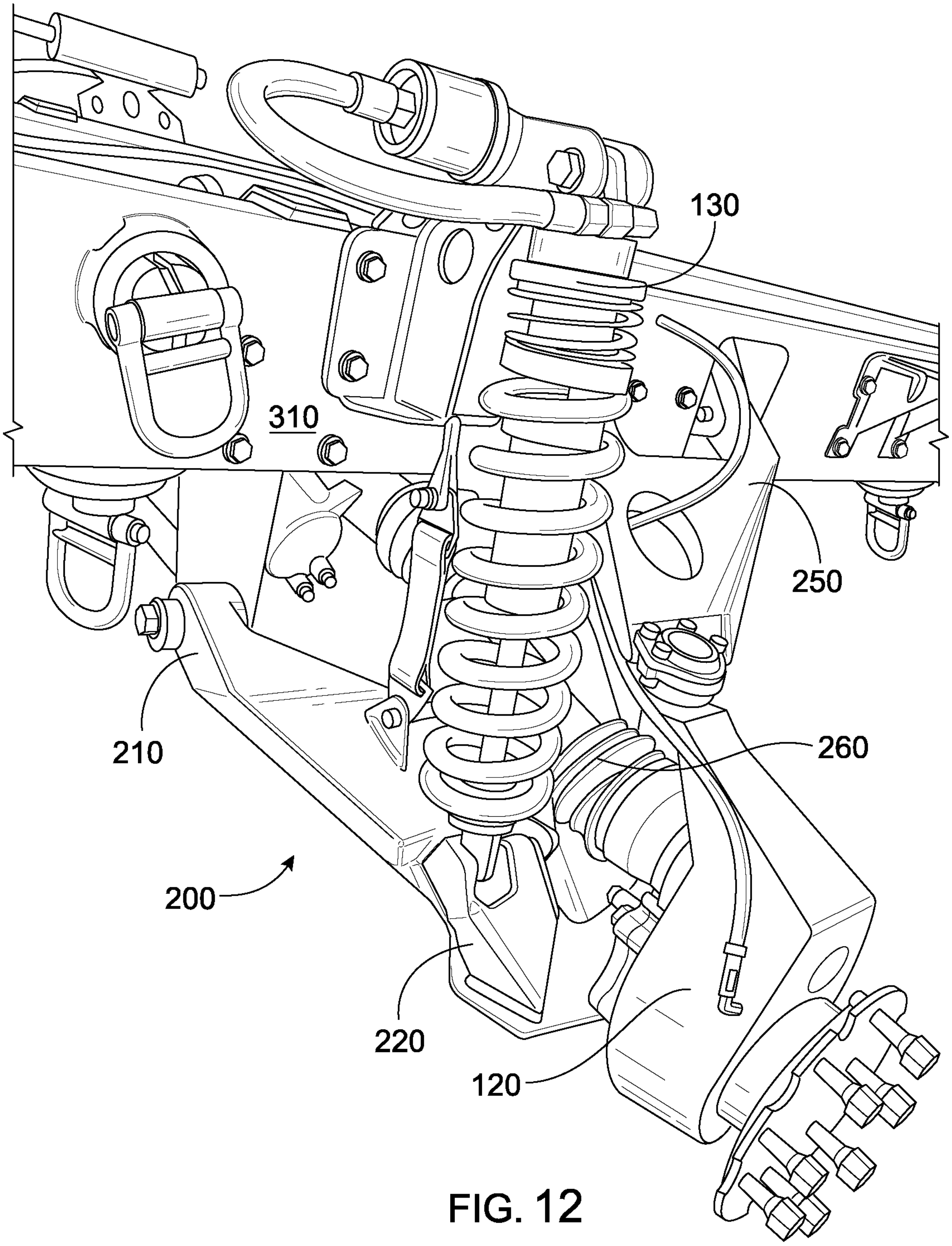
FIG. 12 is a perspective rear-side view of the suspension system operatively coupled to the frame, in accordance with some embodiments of the present disclosure.
Figure 13:
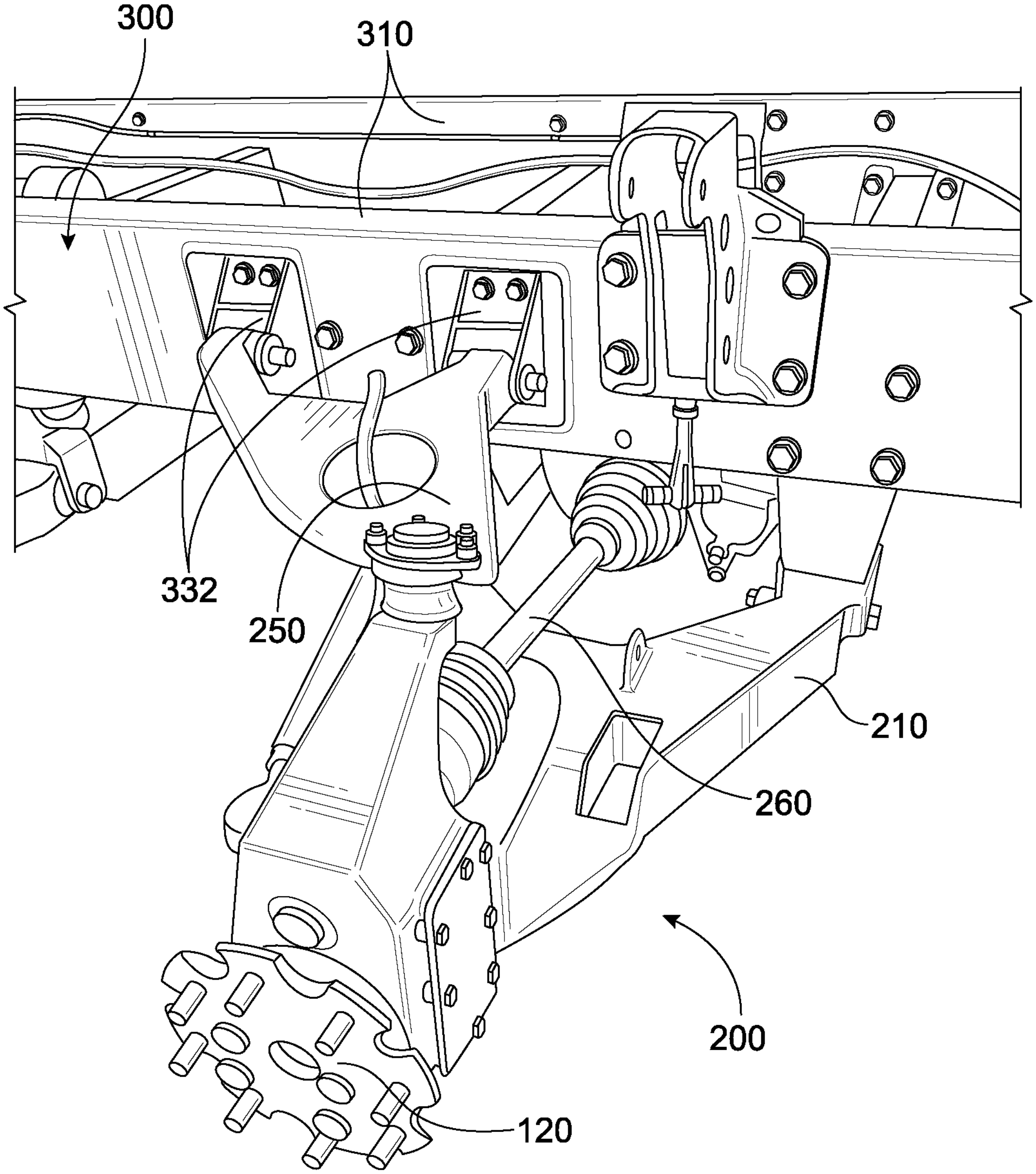
FIG. 13 is a perspective side view of the suspension system operatively coupled to the frame, in accordance with some embodiments of the present disclosure.
Figure 14:
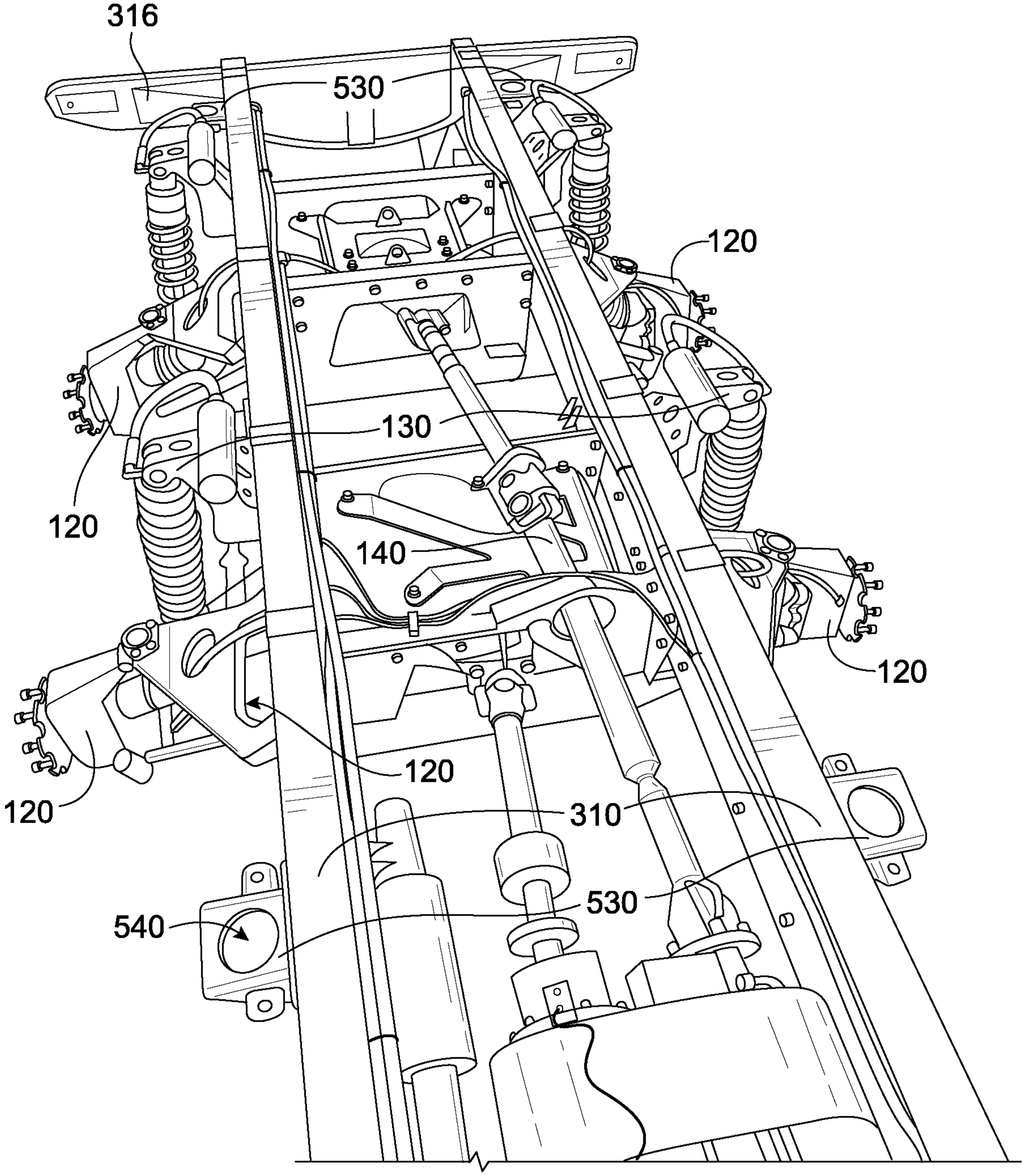
FIG. 14 is a perspective top-front view of the frame, suspension systems, and drive train, in accordance with some embodiments of the present disclosure.
Figure 15:
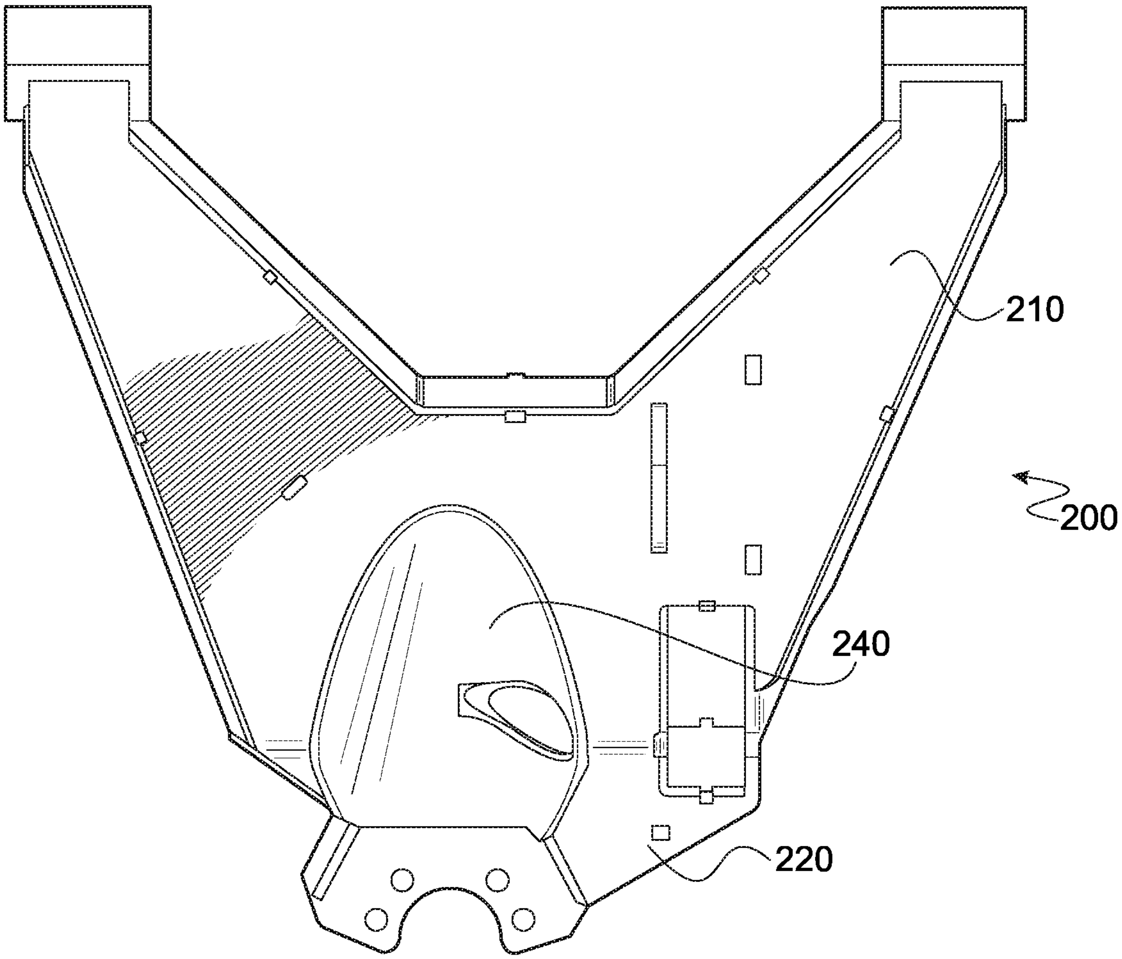
FIG. 15 is a top view of a lower control arm, in accordance with some embodiments of the present disclosure.
Figure 16:
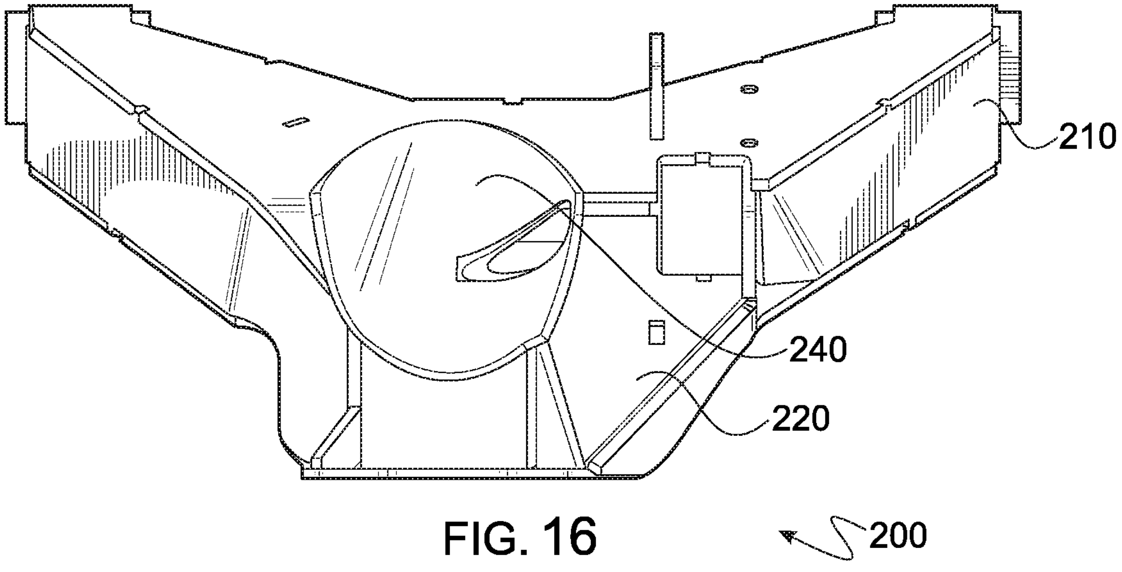
FIG. 16 is a front view of the lower control arm, in accordance with some embodiments of the present disclosure.
Figure 17:
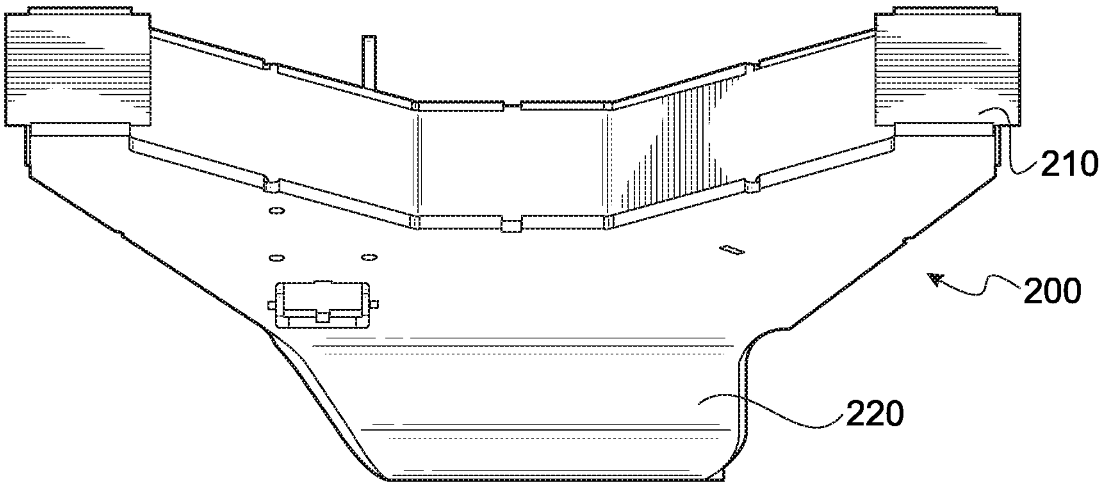
FIG. 17 is a rear view of the lower control arm, in accordance with some embodiments of the present disclosure.

As illustrated in FIGS. 8 through 22B, the suspension of the system may include one or more suspension systems 130 that utilize an improved configuration, such as through the use of an improved lower control arm 200. In some embodiments, a suspension system 130, through the use of the lower control arm 200, may be configured to lift the offroad vehicle 100 above a surface by a lift height. As shown in FIG. 12, the suspension system 130 may be operatively coupled to the frame 300 through the lower control arm 200 and the upper control arm 250, in order to stabilize movement of the vehicle 100 while traversing rough terrain. In some embodiments, the tire assembly 120 may be operatively coupled to the offset arm member 220 of the lower control arm 200, as well as a portion of the upper control arm 250.

Figure 10:
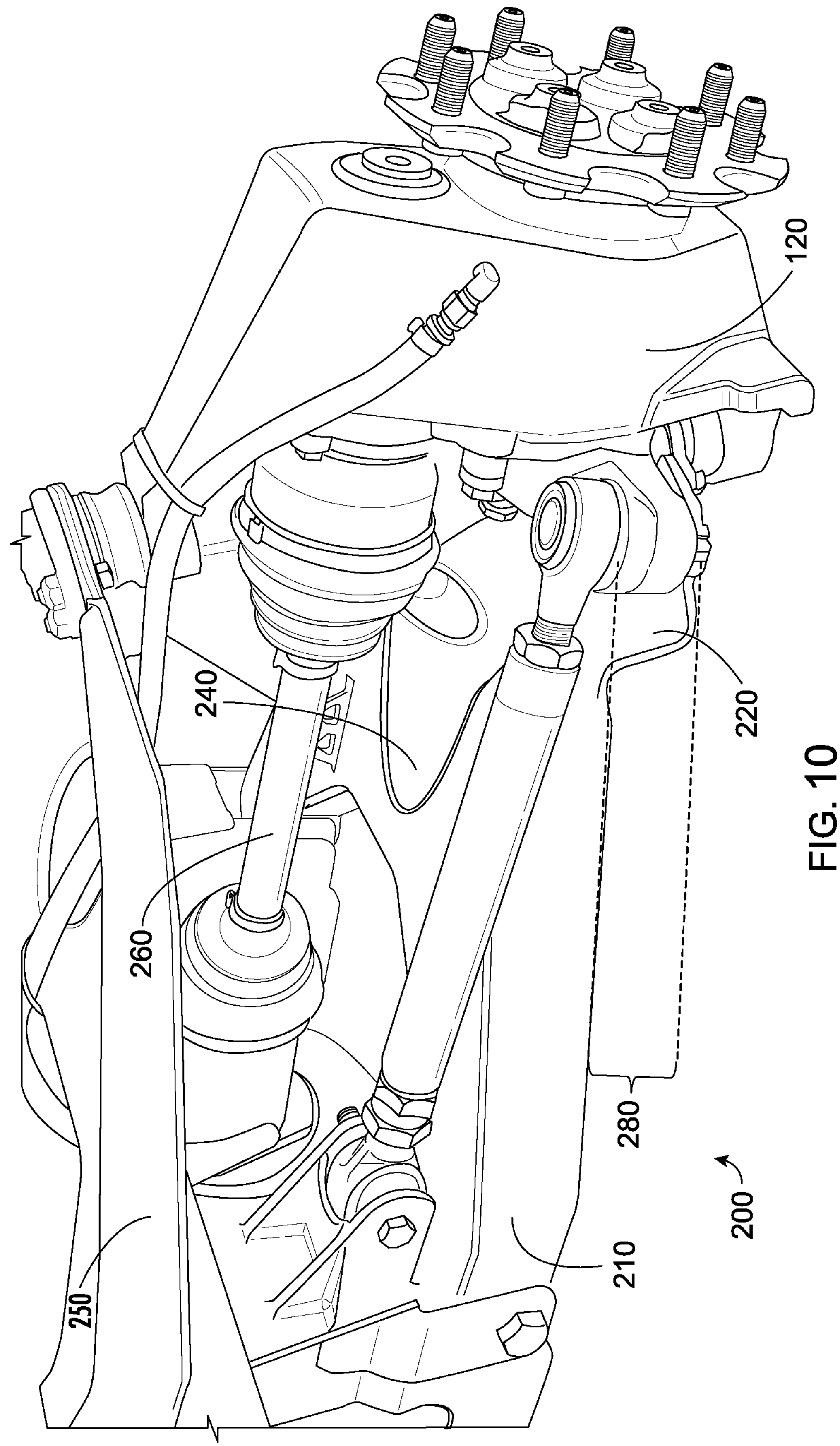
FIG. 10 is an enlarged view of the suspension system with the lower control arm of FIG. 9, in accordance with some embodiments of the present disclosure.
Figure 11:
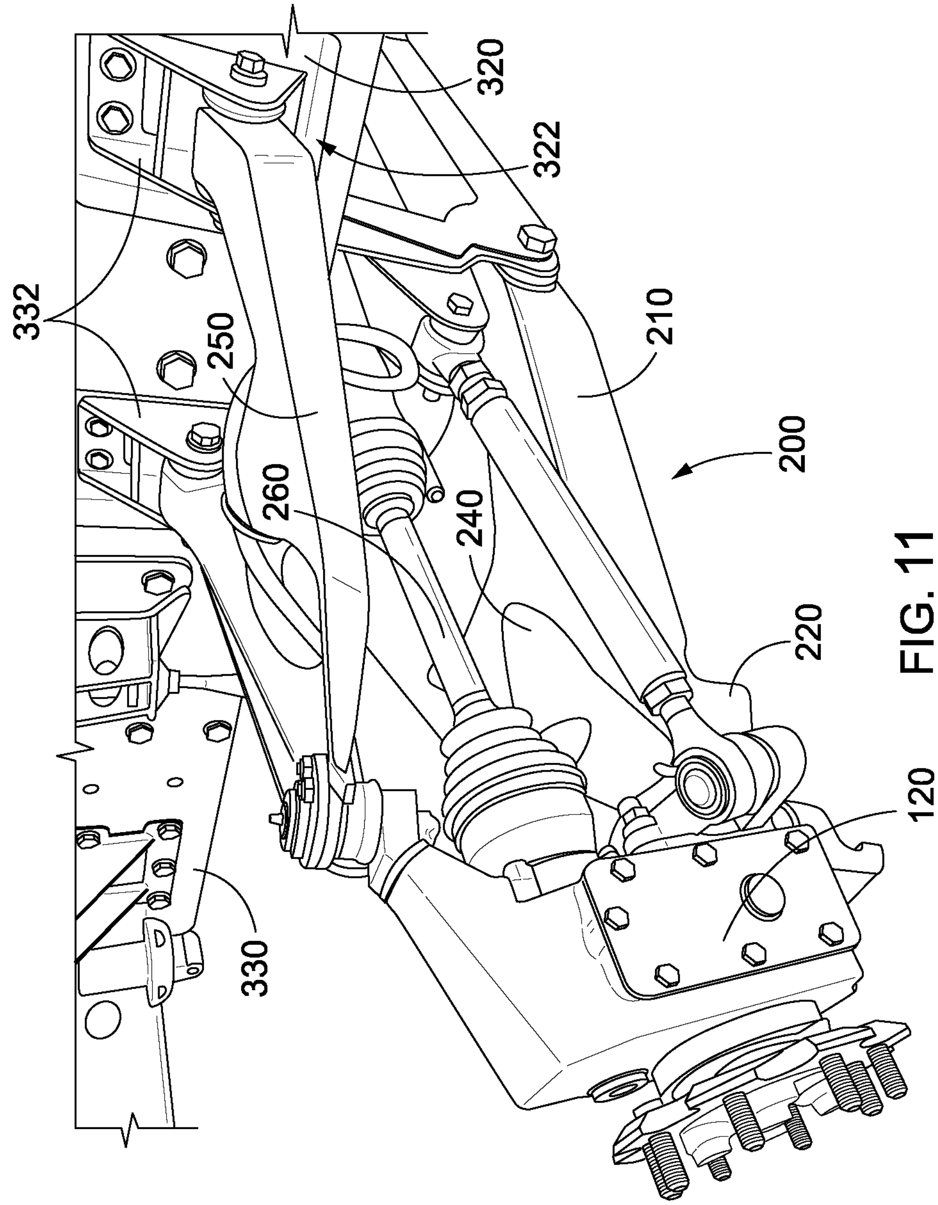
FIG. 11 is a perspective front-side view the suspension system with the lower control arm operatively coupled to the frame, in accordance with some embodiments of the present disclosure.

As shown in FIG. 10 and in some embodiments, the lower control arm 200 may include a primary arm member 210 and an offset arm member 220 operatively coupled to the primary arm member 210. The offset arm member 220 may be operatively coupled to the tire assembly 120, such that the offset arm member 220 provides additional lift 280 for the lift height of the vehicle 100. In some embodiments, the primary arm member 210 and the offset arm member 220 may be integrally operatively coupled to each other (e.g., mold, stamping, bending, or the like) and/or may be separate components that are operatively coupled together (e.g., through weld(s), fastener(s), or the like). For example, the offset arm member 220 may be a protrusion that extends from the primary arm member 210. In this regard, the offset arm member 220 and the primary arm member 210 may be made from the same piece of material.

In other embodiments, the primary arm member 210 and the offset arm member 220 may be manufactured as separate components and operatively coupled together (not shown). In this regard, the primary arm member 210 and the offset arm member 220 may be operatively coupled via high-strength fasteners (e.g., bolts, rivets, etc.), precision welds, reinforced brackets, or other joining methods. The method of coupling may depend on the desired load-bearing capacity, flexibility, and the like of the suspension components. In some embodiments, the lower control arm 200 may be constructed from high-strength materials. For example, the lower control arm 200 may be constructed from high-strength steel, aluminum alloys, titanium alloys, composite materials, or the like. In some embodiments, the lower control arm 200 may be coated with materials that increase longevity of the lower control arm 200 by resisting corrosion and improving operational performance.

Figure 18:
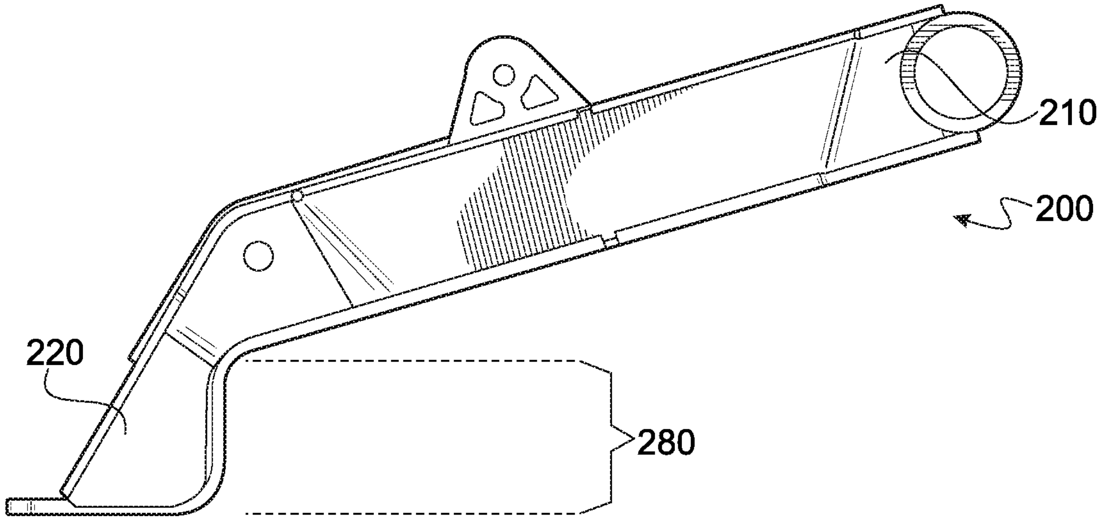
FIG. 18 is a side view of the lower control arm, in accordance with some embodiments of the present disclosure.
Figure 19:
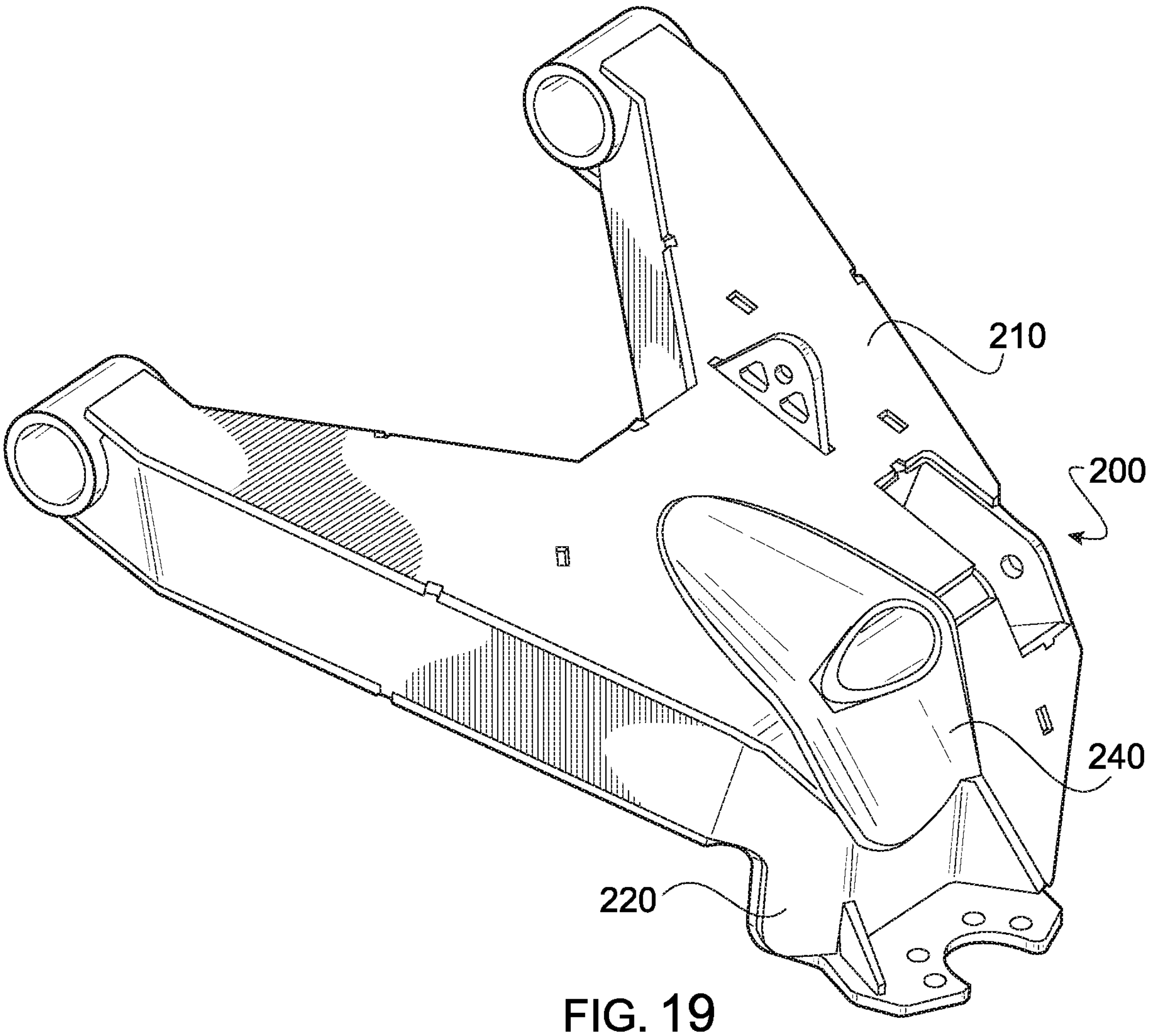
FIG. 19 is a perspective view of the lower control arm, in accordance with some embodiments of the present disclosure.
Figure 20:
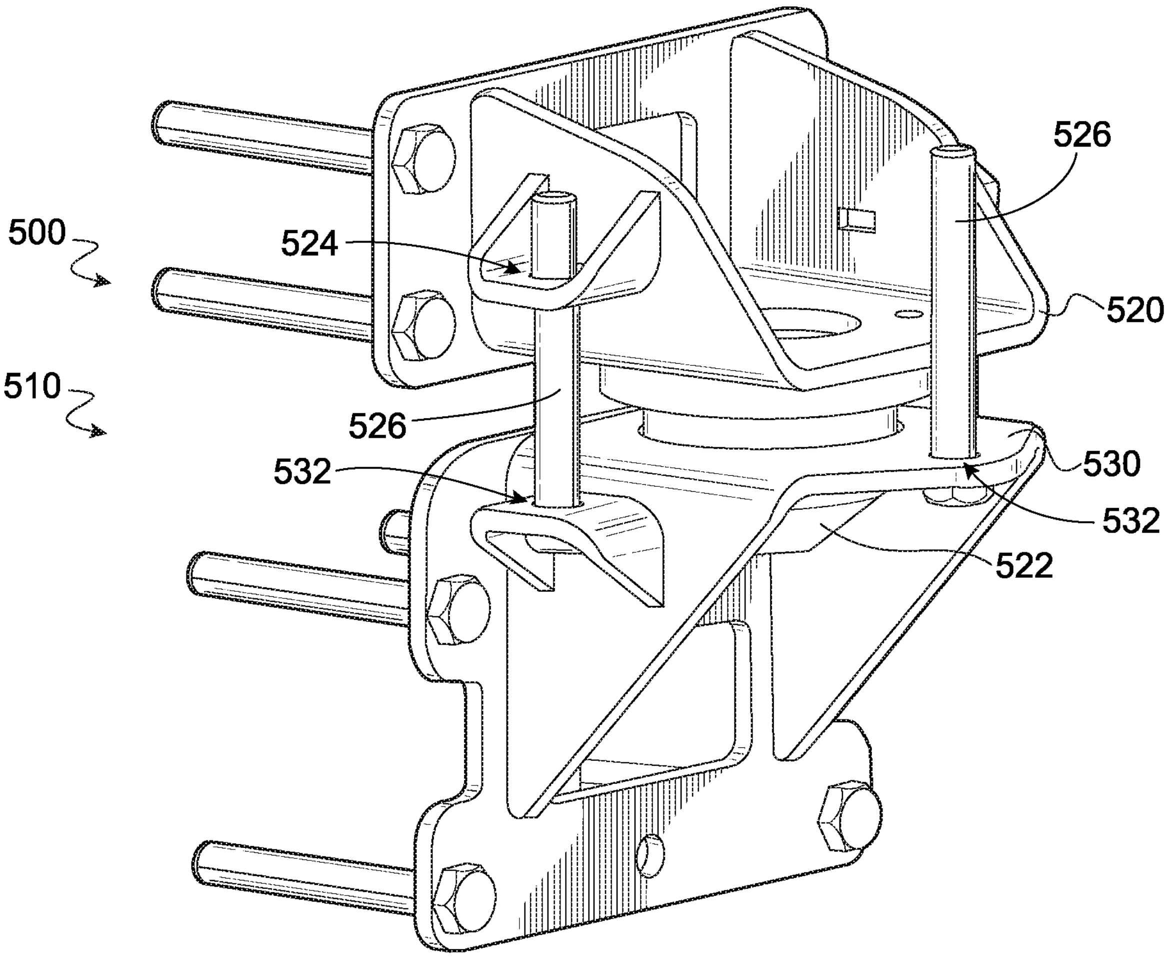
FIG. 20 is a perspective view of a self-locating connector of a bed connector system, in accordance with some embodiments of the present disclosure.
Figure 21A:
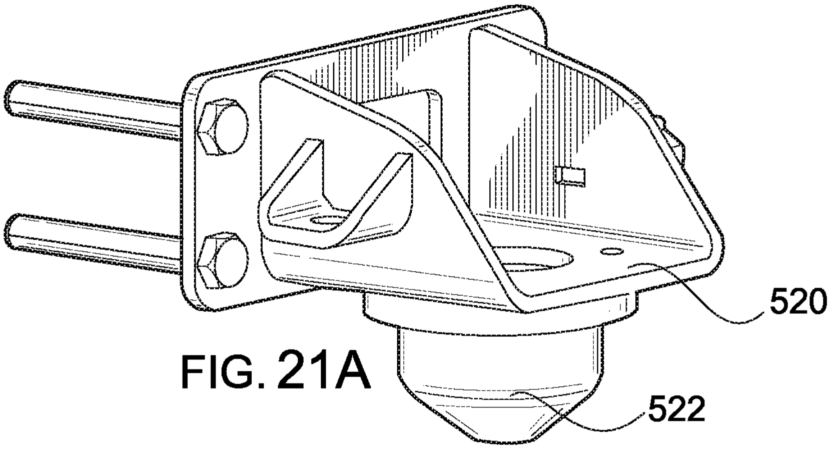
FIG. 21A is a perspective view of an extension connector of the self-locating connector, in accordance with some embodiments of the present disclosure.
Figure 21B:
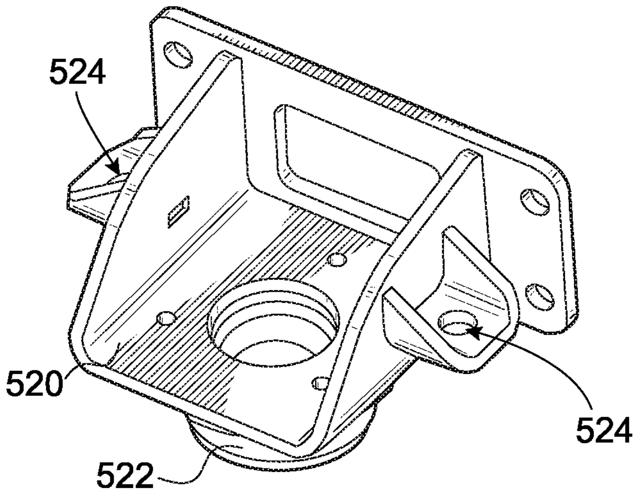
FIG. 21B is a perspective upper view of the extension connector of the self-locating connector of FIG. 21A, in accordance with some embodiments of the present disclosure.
Figure 21C:
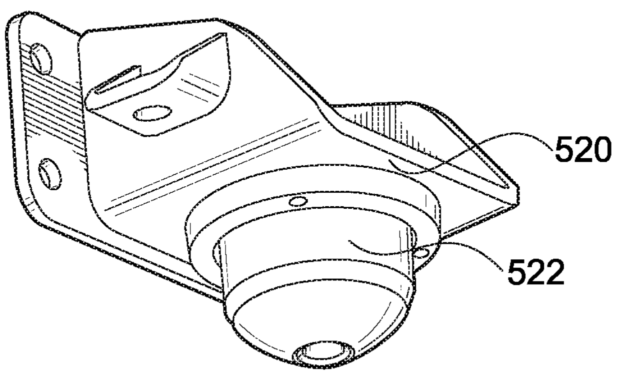
FIG. 21C is a perspective lower view of the extension connector of the self-locating connector, in accordance with some embodiments of the present disclosure.
Figure 22A:
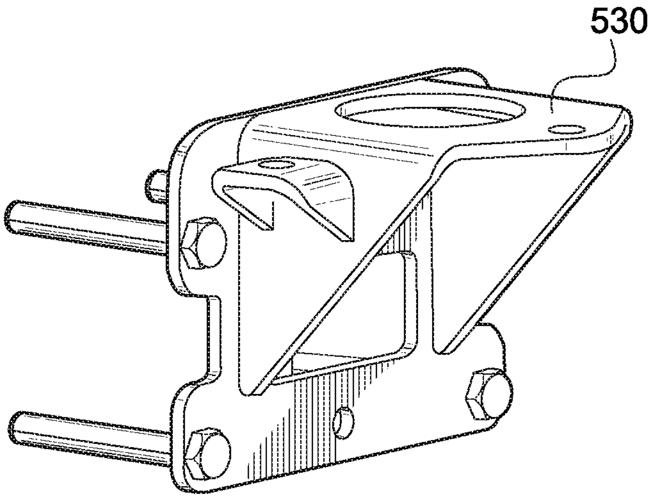
FIG. 22A is a perspective view of a receiver connector of the self-locating connector, in accordance with some embodiments of the present disclosure.
Figure 22B:
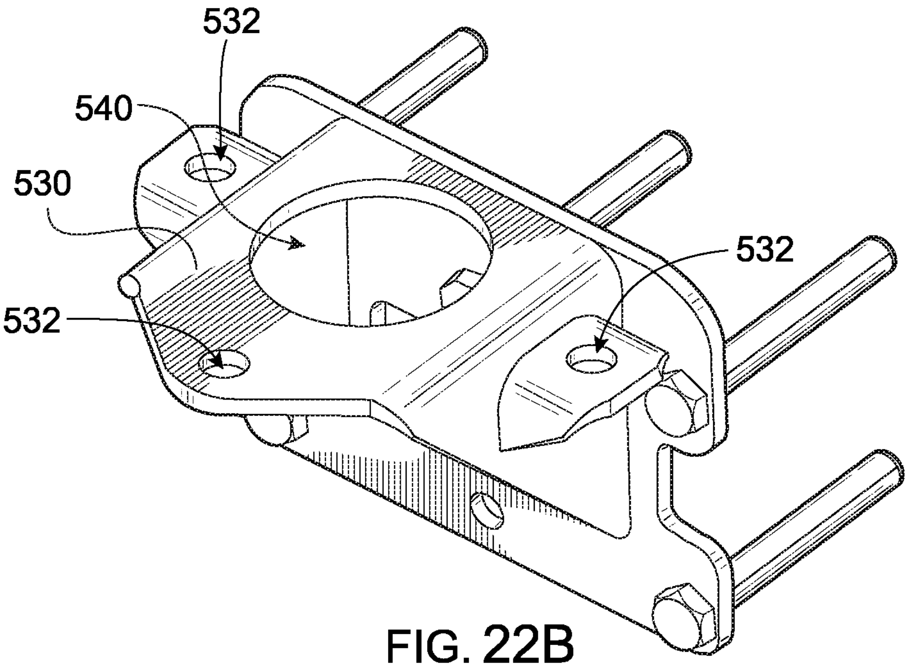
FIG. 22B is a perspective upper view of the receiver connector of the self-locating connector, in accordance with some embodiments of the present disclosure.

In some embodiments, and as shown in FIGS. 8-11 and 17-19, the primary arm member 210 and the offset arm member 220 may form an L-shaped lower control arm 200. Further, as illustrated in FIGS. 10 and 18, the additional lift 280 may include the difference in height the offset arm member 220 raises the vehicle in relation to a surface or terrain on which the tire rides. In some embodiments, the additional lift 280 may be defined by the offset arm member's 220 downward vertical extension from the primary arm member 210.

Figure 8:
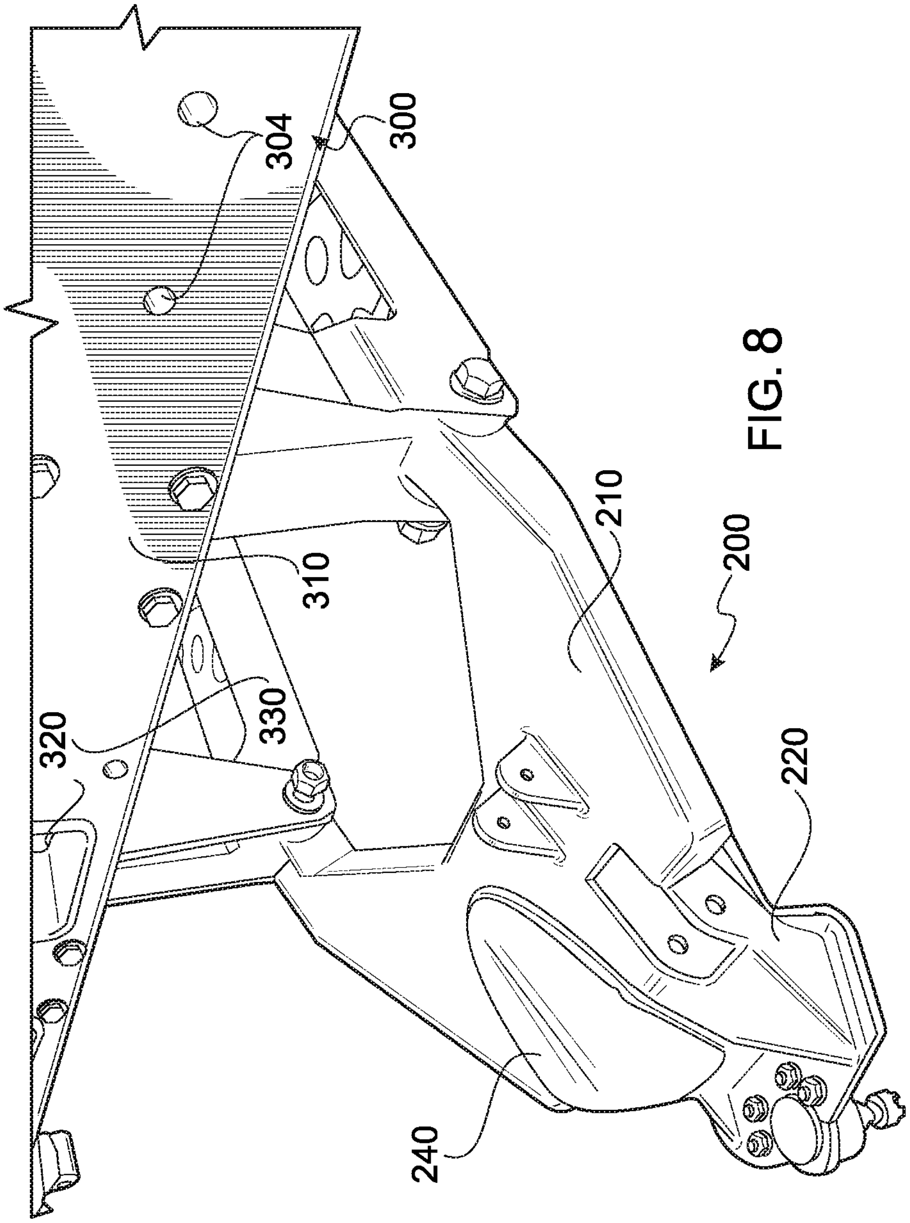
FIG. 8 is a perspective rear-side view of a lower control arm of a suspension system operatively coupled to the frame, in accordance with some embodiments of the present disclosure.

In some embodiments, the lower control arm 200 may be L-shaped due to the primary arm member 210 extending in a relatively horizontal manner away from the frame 300 (as shown in FIG. 8) and the offset arm member 220 extending relatively vertically downward from an edge of the primary arm member 210 (as shown in FIG. 18). Further, in some embodiments, the primary arm member 210 and the offset arm member 220 may form an angled connection that approximately resembles an L-shape.

As used herein, “horizontal,” “vertical,” “downward,” “upward,” or the like are intended to describe directionality and are not intended to limit the disclosure herein to the mentioned direction. Further, “horizontal,” “vertical,” “downward,” “upward,” or the like, should not be interpreted to limit the disclosure provided herein to exact directionality, but may include exact directionality within the description.

In some embodiments, the offset arm member 220 may provide key benefits for the vehicle 100. For example, the offset arm member 220 providing the additional lift height 280 may increase the ground clearance, provide enhanced ride comfort, and provide field-adjustable lift heights. In some embodiments, the offset arm member 220 may be coupled to the primary arm member 210 in a way that allows a user to adjust the height of the additional lift height 280. In some embodiments, a user may be able to adjust the height of the offset arm member 220 in the field, providing additional adaptability of the vehicle 100.

In some embodiments, the lower control arm 200 may include a clearance channel 240 (e.g., a closed channel, a channel opening, or the like), wherein the clearance channel 240 allows a rotating member 260 (e.g., drive shaft, such as rear or front drive shafts) to connect to a tire assembly 120. As shown in FIG. 8-11, and 19, the clearance channel 240 (e.g., indention, groove, aperture, or the like) provides clearance for the rotating member 260 (or housing thereof) to connect to the tire assembly 120 while providing the additional lift to the vehicle 100. In some embodiments, the offset arm member 220 may raise the frame 300 in relation to the tire assembly 120. Further, due to the relative height difference (e.g., the additional lift 280, as provided by the offset arm member 220), the rotating member 260 (or housing thereof) may require the clearance provided by the clearance channel 240 during operation of the vehicle 100. In this regard, the clearance channel 240 may ensure the rotating member 260 may operate unimpeded during operation of the vehicle, even when the vehicle is subjected to dynamic terrain changes, aggressive turning, or otherwise extreme conditions. For example, if the vehicle 100 encounters rough or uneven terrain which causes the tire assembly 120 (and thus the control arms 200, 250 of the suspension system 130) to move upward in relation to the frame 300, the clearance channel 240 provides clearance such that the lower control arm 200 does not contact the rotating member 260 (e.g., drive shafts), or a housing for the rotating member 260.

In some embodiments, the clearance channel 240 may be shaped and dimensioned based on dimensions, displacement, movement range, and the like of the rotating member 260. For example, the depth of the clearance channel 240 may accommodate the full range of motion of the rotating member 260 to ensure no interference, even during extreme offroad scenarios. In some embodiments, the clearance channel 240 may include a smooth rounded geometry to minimize structural weakening and reduce stress concentrations.

As shown in FIGS. 8-13, the lower control arm 200 and the upper control arm 250 may be attached to the frame 300 via a mounting bracket 332 (e.g., upper mounting brackets and lower mounting brackets). It should be understood that both the upper control arm 250 and the lower control arm 200 may have two points of contact with the frame (e.g., pivoting points of contact).

As discussed herein, a first side of the upper control arm 250 may be coupled to the frame 300 via one or more hinged mounts (e.g., mounting brackets 332 as shown in FIG. 9) and a second side of the upper control arm 250 may be coupled to an upper portion of the tire assembly 120. Additionally, the lower control arm 200 is operatively coupled to the adjacent the center of the tire of the tire assembly 120. When the tire assembly 120 moves in a vertical direction due to irregularities of the surface, the upper control arm 250 and lower control arm 200 may govern the tire assembly’s 120 vertical travel. In some embodiments, the upper control arm 250 and lower control arm 200 may keep the tire assembly 120 aligned and maintain proper tire contact with the surface, while providing the additional lift height 280 discussed herein.

Further, in some embodiments, the hinged mounted bracket (e.g., mounting bracket 332) may control the direction of travel of the upper control arm 250 to a single degree of freedom (e.g., the vertical direction) through the use of dual mounting points. As such, the mounting bracket 332 may allow the upper control arm 250 to freely move in the single degree of freedom such that the mounting bracket 332 maintains the radial distance between the tire assembly 120 and the mounting bracket 332. Consequently, when the tire encounters terrain that causes a force on the tire in both a horizontal and vertical direction, the mounting bracket 332 may only allow the tire to travel in the vertical direction.

In addition, the lower control arm 200 allows the vehicle 100 to maintain a surface clearance larger than conventional control arms allow. The additional lift 280 (as shown in FIGS. 10 and 18) provided by the offset arm member 220 increases the overall surface clearance of the frame 300 of the vehicle 100. Additionally, or alternatively, in some embodiments, the lower control arm 200 near the offset arm member 220 may clear objects a conventional control arm would normally contact.

Figure 2:
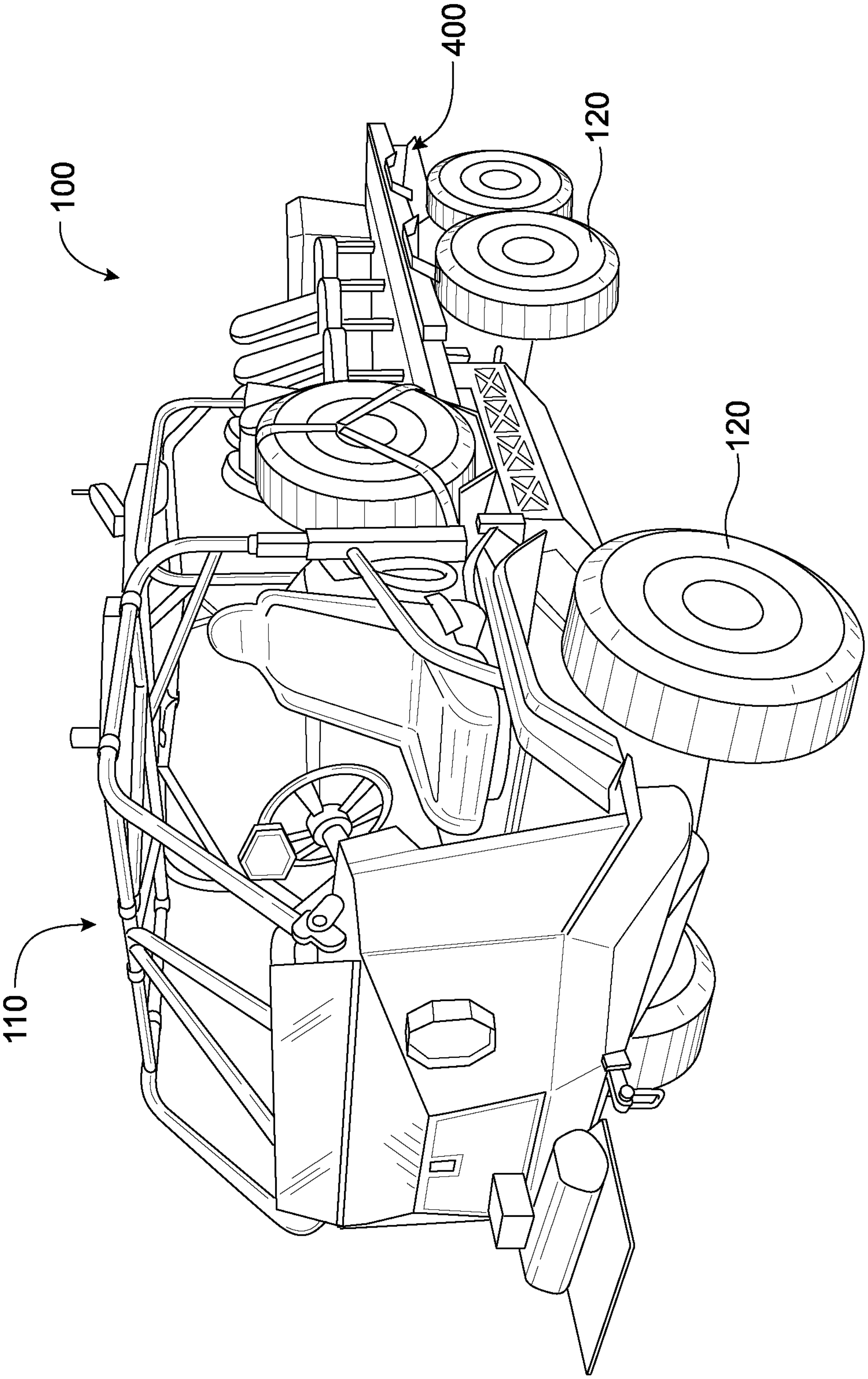
FIG. 2 is a perspective front-side view of the offroad vehicle, in accordance with some embodiments of the present disclosure.

As illustrated in FIGS. 1 and 2, the offroad vehicle 100 may include one or more beds 400 operatively coupled to the frame. Further, the bed 400 (not shown in FIG. 3) may be positioned behind the cab 110. It should be understood that the vehicle 100 may be able to support a single bed 400, two or more beds 400 next to each other (e.g., longitudinally along the frame 300 or laterally across the frame 300), and/or two or more beds 400 stacked on top of each other.

Figure 25:
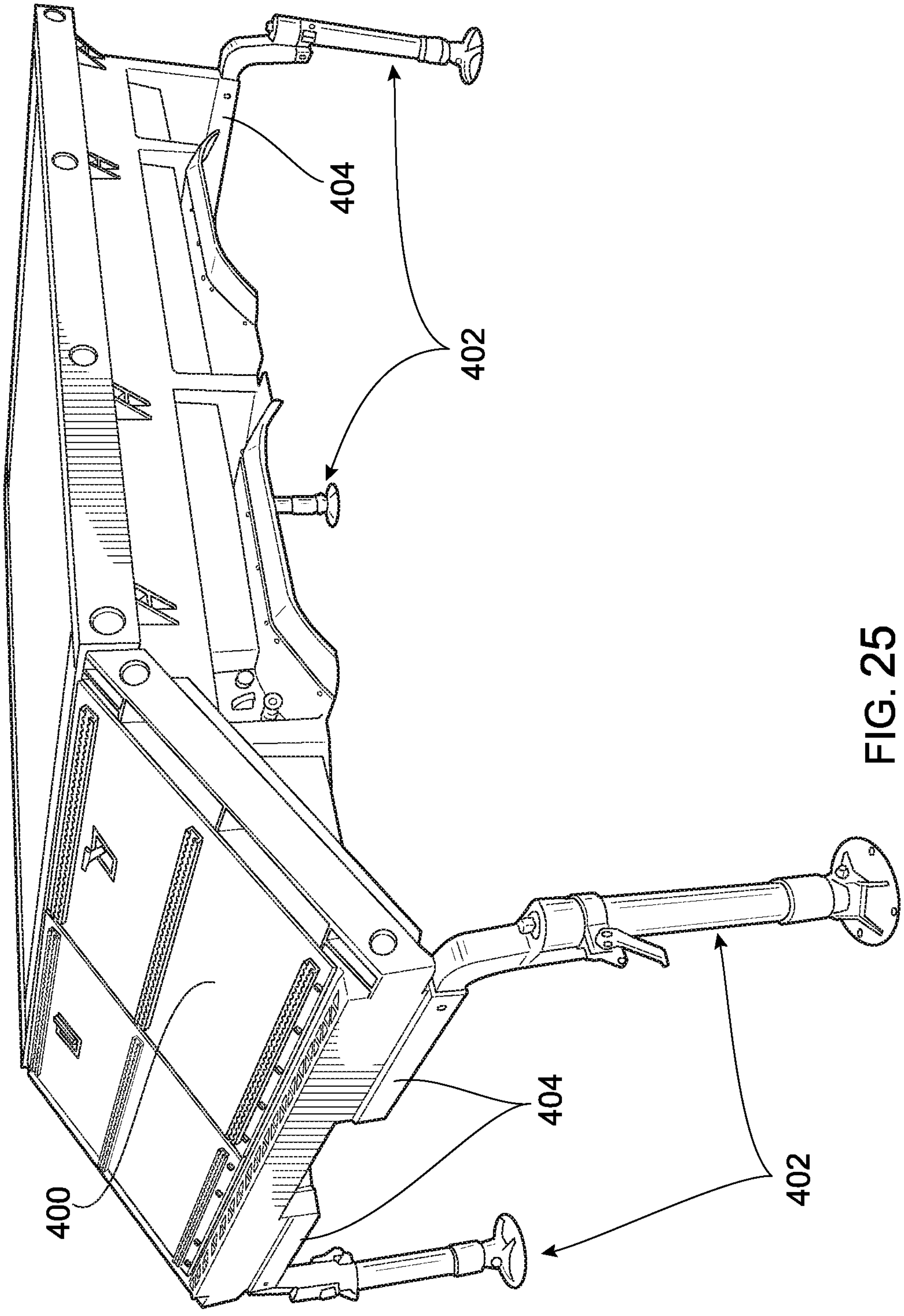
FIG. 25 is a perspective view of a bed, in accordance with some embodiments of the present disclosure.
Figure 26:
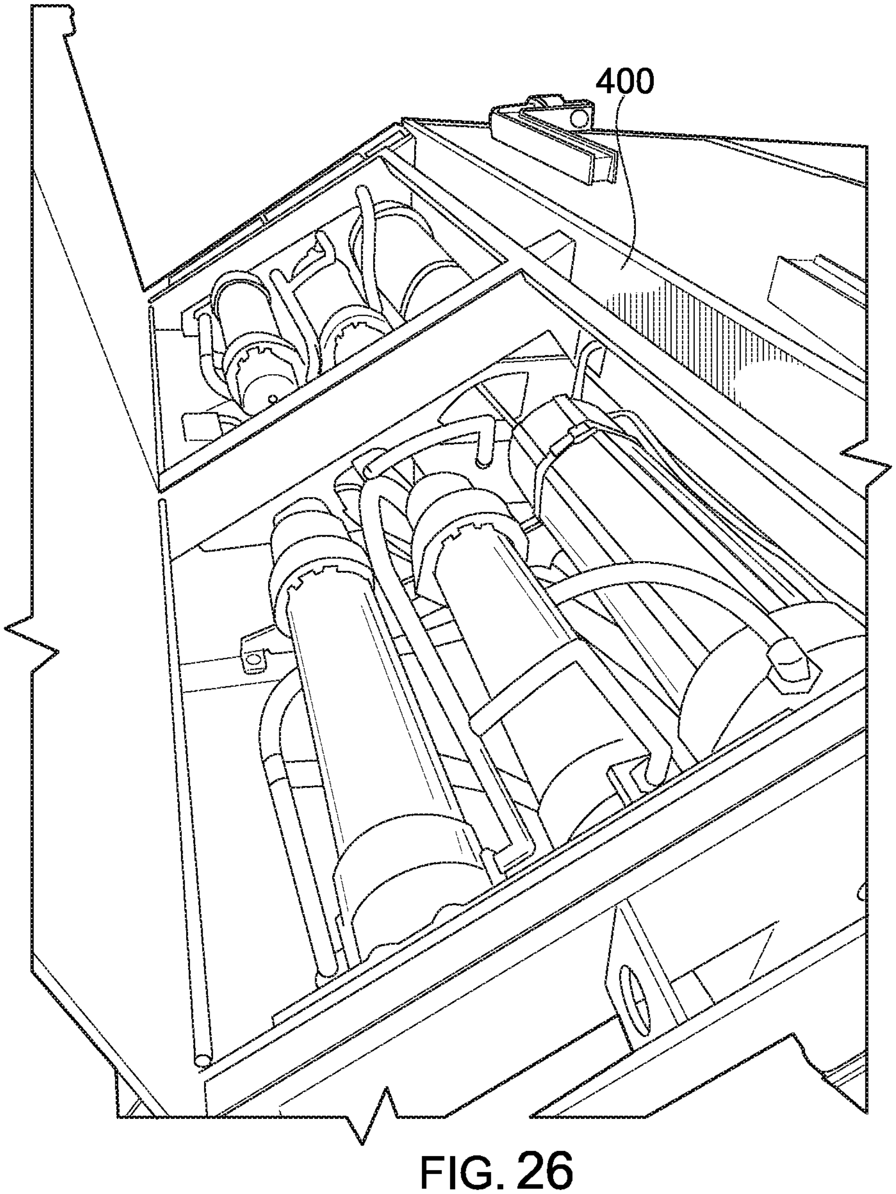
FIG. 26 is a view of a bed compartment, in accordance with some embodiments of the present disclosure.
Figure 29:
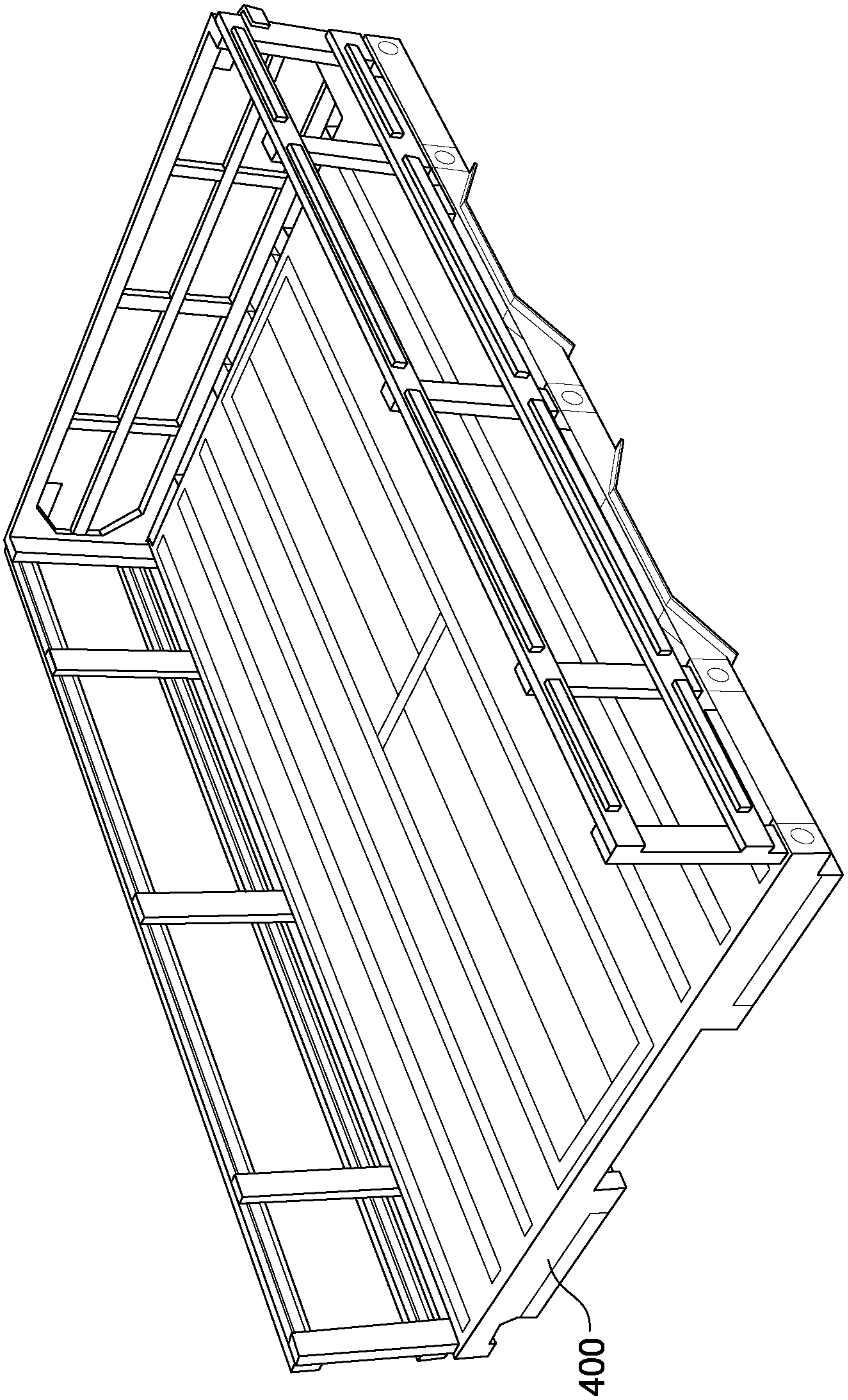
FIG. 29 is a top perspective view of a bed with railings, in accordance with some embodiments of the present disclosure.

In some embodiments, and as shown in FIGS. 25 and 26, the one or more beds 400 may include a plurality of interchangeable modular beds 400. In this way, the beds 400 may be modular, and as such different beds 400 that serve different purposes may be utilized in the field. In some embodiments a bed 400 may have one or more bed components, which in some embodiments may also be modular. As such, the modular beds 400 and/or modular bed components for a bed 400 may provide varying functionality for the vehicle 100 (e.g., offroad vehicle 100). For example, and as shown in FIGS. 1 and 2, the bed 400 may provide a weapons system mount and additional capacity for personnel, as well as storage capabilities. In another example, and as shown in FIGS. 25 and 26, the bed 400 may be a tank module (e.g., water tank, fuel tank, or the like) with compartments for storing fluid systems (e.g., pumps, a filtration system, or the like). Moreover, the tank module may allow for different components to be attached to, or cargo supported on, the top of the bed 400 above the tank. In other embodiments, the bed 400 may be changed with other beds (not shown), or modular bed components thereof may be changed to equip the vehicle 100 with a flatbed module, a weapons module, armor module, a fluid tank supply module (e.g., as shown in FIG. 26), a seated transport module (as shown in FIG. 1), a truck bed module (e.g., as shown in FIG. 29), a medical assistance module, or the like.

Figure 30:
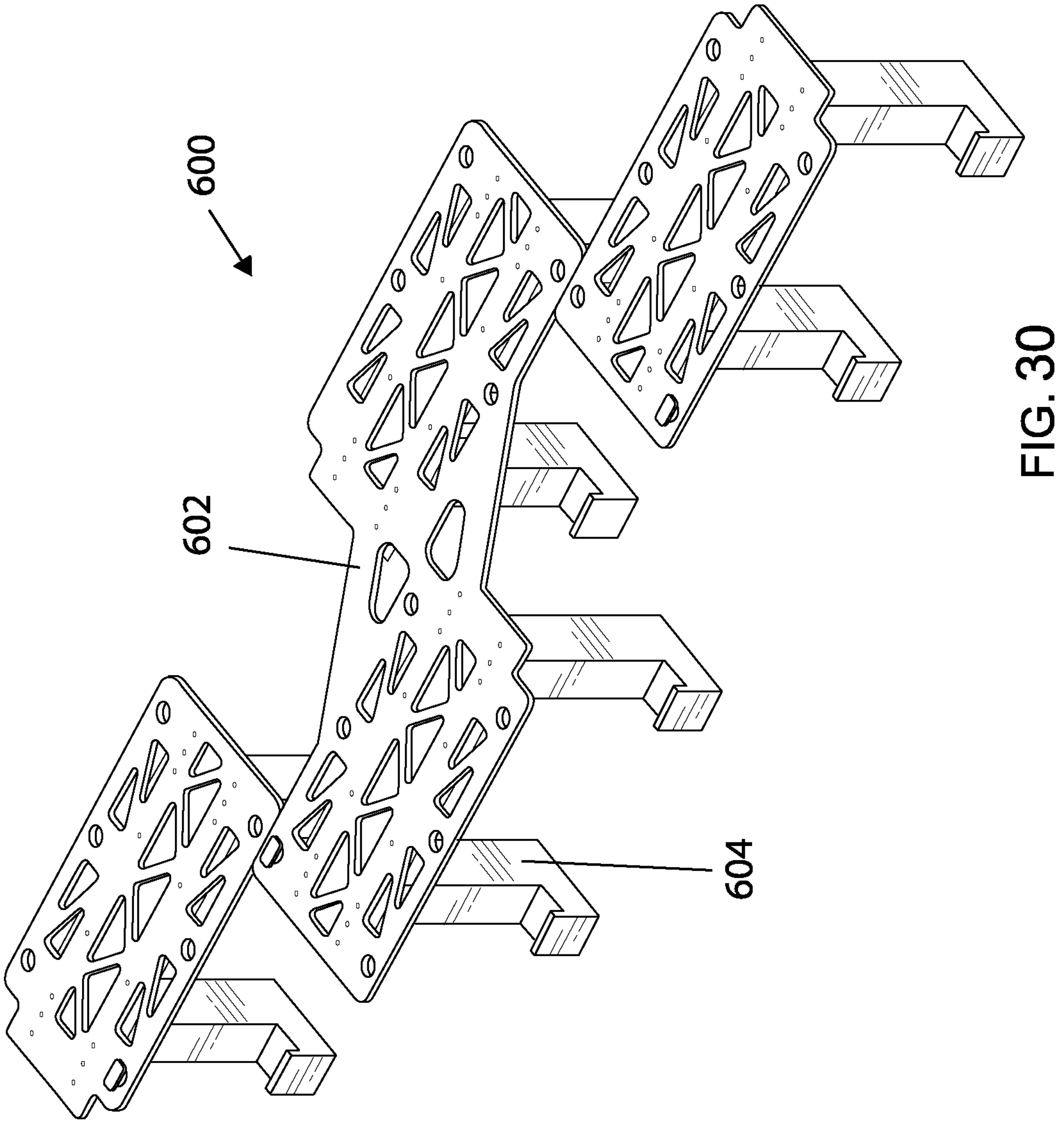
FIG. 30 is a top perspective view of a motorcycle mount used on a bed, in accordance with some embodiments of the present disclosure.
Figure 31:
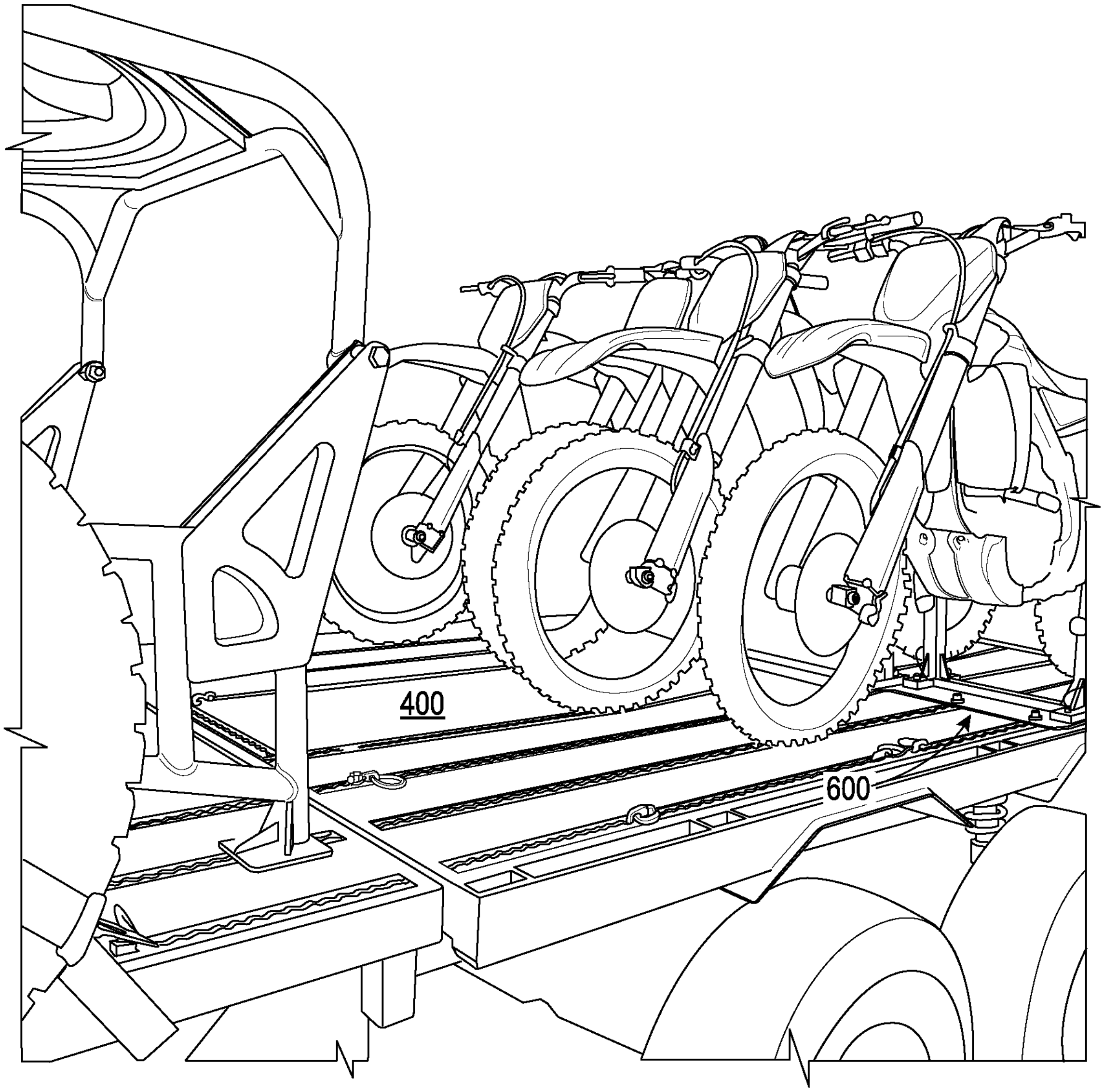
FIG. 31 is a perspective view of a plurality of motorcycles coupled to the bed via the motorcycle mount, in accordance with some embodiments of the present disclosure.
Figure 32:
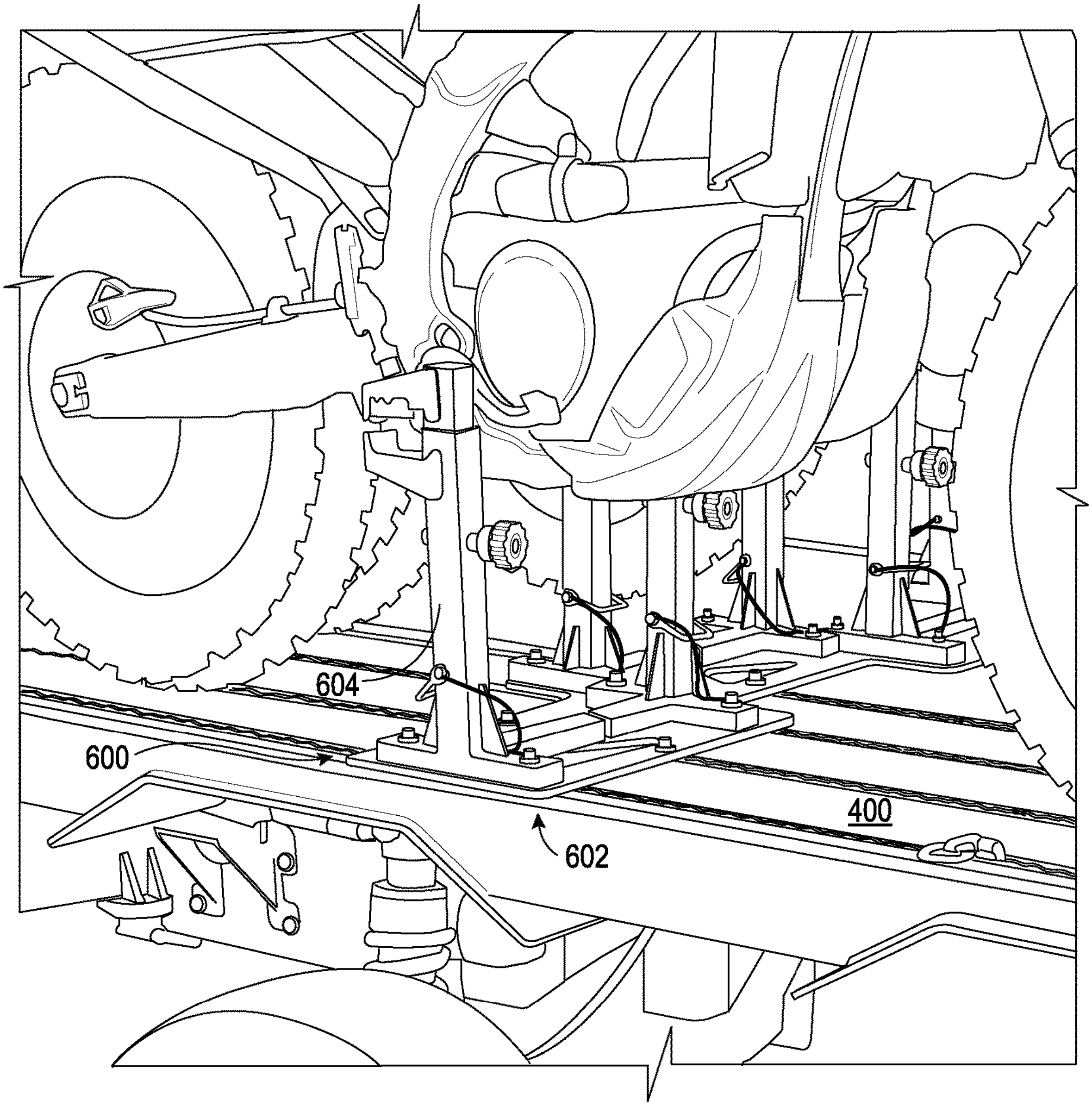
FIG. 32 is a close up view of a motorcycle coupling to the motorcycle mount, in accordance with some embodiments of the present disclosure.

Further, in other embodiments, the bed components may be interchangeable and may include specific components that allow for configurability of the bed 400. For example, as shown in FIG. 30, a motorcycle mount 600 may be used to store motorcycles on the bed 400. In this regard, the motorcycle mount 600 may secure to the bed 400 by a mounting bracket (e.g., flat mounting bracket portion 602 as illustrated in figures) coupling to the bed's 400 flanged L-track via double stud fittings. A motorcycle may then mount to a motorcycle support device (e.g., footpeg device 604, such as a strapless footpeg device) that secures the motorcycle to the mount 600 via the motorcycle footpegs. For example, as shown in FIG. 31, the motorcycle mount 600 may couple to the bed 400 and may provide storage for a plurality of motorcycles. Further, as shown in FIG. 32, the mounting bracket (e.g., flat mounting bracket portion 602) may be configured to couple to the bed 400. The flat portion 602 may be fastened to the bed to provide a secure attachment point, and may be fastened via a connector (e.g., welds, clamps, clips, fasteners, such as bolts, screws, nuts, pins, or the like, or other like connector). Further, the motorcycle support device (e.g., footpeg device 604) may provide an attachment point for the motorcycles to attach to. For example, the motorcycle's footpegs may couple to the footpeg device 604 while the motorcycle is in a storage position on the motorcycle mount 600. In some embodiments, the footpeg device 604 (or other motorcycle support device) may be configured and/or adjusted to accommodate different attachment points to the motorcycle and/or different sized motorcycles. For example, the adjustability of the footpeg device 604 (or other motorcycle support device) may include telescoping adjustability that may allow for the footpeg device 604 (or other motorcycle support device) to be raised and/or lowered in order to secure the motorcycle. In some embodiments, the footpeg device 604 (or other motorcycle support device) may have rotational adjustability to couple to different locations on the motorcycle. In other embodiments, the footpeg device 604 (or other motorcycle support device) may be adjustable via hinges, clamps, or the like. Additionally, or alternatively, in some embodiments, the footpeg device 604 (or other motorcycle support device) may secure the motorcycles by producing a force on the motorcycle to secure the motorcycle (e.g., a clamping force). In other embodiments, the footpeg device 604 (or other motorcycle support device) may include cables, tensioners, chains, magnets, or other ways to secure the motorcycle to the motorcycle mount 604. However, it should be understood that the footpeg device 604 may provide an improvement over traditional mounts by allowing for coupling of the motorcycles without the need for cables, straps, tensioners, chains, or other like flexible members. That is, the footpeg device 604 allows for quick assembly and disassembly of the motorcycle from the motorcycle mount 604. Furthermore, it should be understood that the motorcycle mount 604 mount may be a vehicle mount 604 that is used to secure other types of vehicles (e.g., other two, three, four, or the like wheeled vehicles) using a vehicle support device that is the same as or similar to the footpeg device 604.

Figure 28:
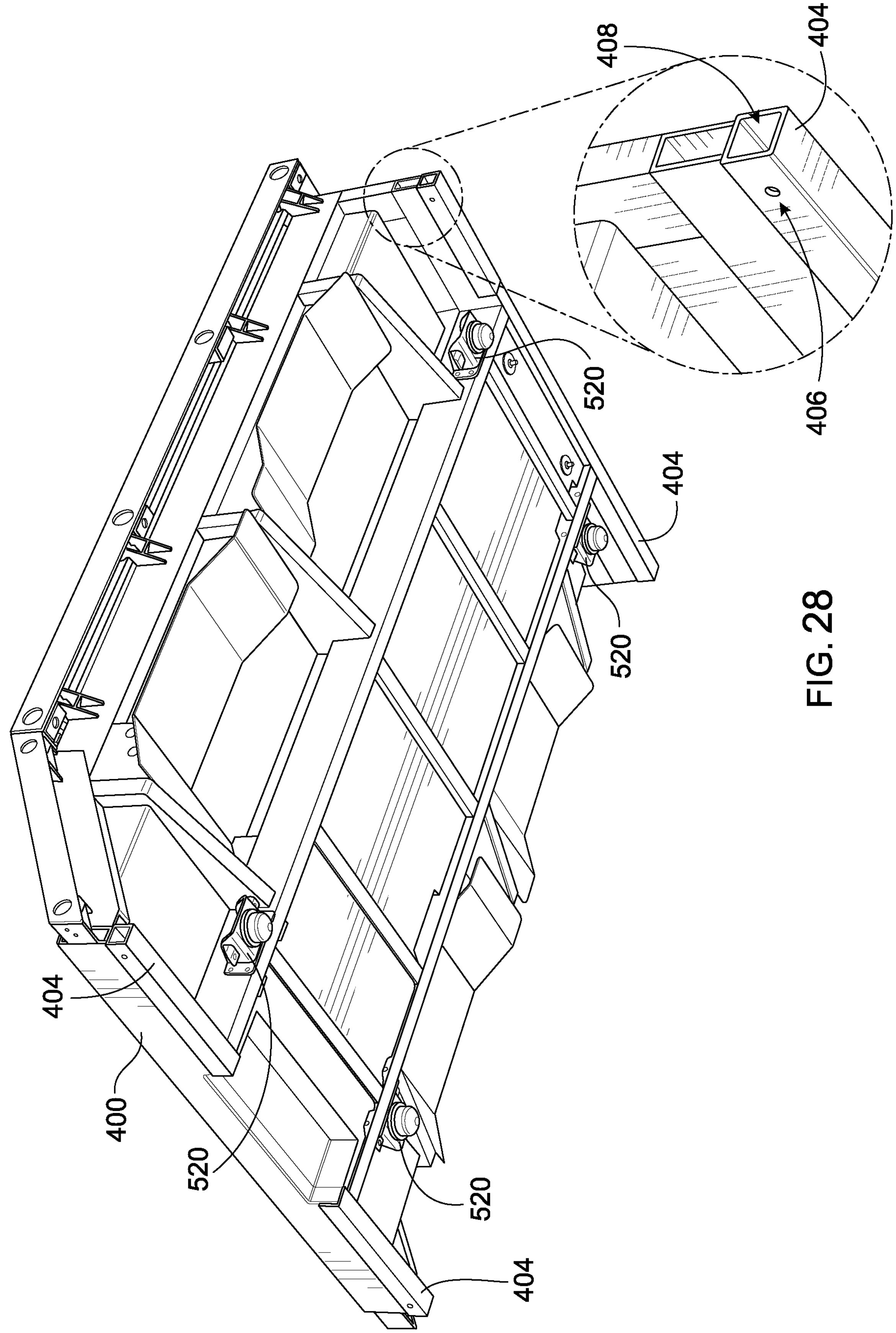
FIG. 28 is a bottom perspective view of a bed with a detail view of a tube used by a jack, in accordance with some embodiments of the present disclosure.

In some embodiments, the bed 400 may be stored in a raised position off the ground as shown in FIG. 25. In this regard, the bed 400 may be stored through the use of one or more bed support assemblies, such as one or more storage posts 402, as illustrated in the figures. In some embodiments, the storage posts 402 may slide into one or more tubes 404 located on the underside of the bed 400. In some embodiments, and as shown in FIG. 28, the tube 404 may include a hollow portion 408 with which the post 402 interacts (e.g., slides into). Further, in some embodiments, the tube 404 may include an aperture 406 which may be used to secure the storage post 402 to the bed 400. In some embodiments, a locking pin or the like may be slid through the aperture 406 and lock the post 402 to the bed 400. In some embodiments, the storage posts 402 may couple to the bed 400 using another method, such as another connector (e.g., via a fastener—bolt, nut, pin, dowel, or the like—, weld, clip, clamp, or other attachment mechanism). The one or more storage posts 402 may be utilized in the operation position for supporting a bed 400 during storage and/or interchanging beds 400. However, when not in use, the one or more storage posts 402 may be coupled to the bed 400 in a different position (e.g., a stowed position) when not in use (e.g., in a horizonal position instead of a vertical position, inserted into the tube 404 from the opposite end stowed) and/or when the bed 400 is installed on the vehicle. Furthermore, the storage posts 402 may be adjustable to change the height at which the posts 402 may lift the bed (e.g., through mechanical, hydraulic, pneumatic, or the like adjustability). The adjustability may occur through the use of retractable and/or collapsable telescoping posts, jacks, or other like adjustable features. In some embodiments, the adjustability may also include angular adjustability (e.g., pivoting or tilting), rotational adjustability (e.g., rotating about a central axis), lateral adjustability, height adjustability (e.g., indexing, detent systems, etc.), or the like.

While a particular type of best support assembly is illustrated as a storage post 402, it should be understood that the one or more bed support assemblies may include other types of support structures. For example, the support structures may include, but are not limited to: folding leg assemblies, retractable structs, scissor-lift style systems, kickstand-style supports, integrated jack assemblies, or the like.

The capability to change the bed 400 (or bed components thereof) provides adaptability and modularity to the vehicle 100 while reducing issues associated with logistics, planning, and operations involved with having multiple, dedicated vehicles that provide those same varying functionalities. In other words, the vehicle 100 having the capability to interchange the beds 400 reduces overhead resources and expenses associated with obtaining the same functionality in the field with multiple vehicles.

The capability to interchange the beds 400 is provided through the bed connector system 500, as shown in FIGS. 20-24, and 28. In some embodiments, the bed connector system 500 may include a plurality of self-locating connectors 510 configured to operatively couple the one or more beds 400 to the frame 300. In this way, the bed connector system 500 provides modularity and interchangeability via swapping out different beds 400 from the vehicle 100. In some embodiments, the self-locating connectors 510 may include an extension connector 520 that forms a projection 522. The projection 522 may be a cylindrical projection with a uniform outer diameter; however, the projection 522 may be a converging projection (e.g., a cone, or the like) that converges as it extends away from the extension connector 520, which aids in the assembly of the beds 400 to the frame 300 (or to other beds 400 should the beds 400 be stacked).

In some embodiments, the extension connector 520 may be operatively coupled to the frame 300 (e.g., a separate component coupled to the frame, or may be integral within the frame). Alternatively, or additionally, the extension connector 520 may be operatively coupled to the one or more beds 400 (e.g., a separate component coupled to beds, or may be integral with the beds). Further, in some embodiments, the self-locating connectors 510 may include a receiving connector 530 with surfaces that form a connector aperture 540. The connector aperture 540 may be a uniform hole, or it may be a converging aperture that is configured to receive the projection 522 of the extension connector 520. In some embodiments, the connector aperture 540 may help center and/or align the projection 522 of the extension connector 520. In some embodiments, the receiving connector 530 may be operatively coupled to the frame 300 (e.g., a separate component coupled to the frame, or may be integral within the frame). Alternatively, or additionally, the receiving connector 530 may be operatively coupled to the beds 400 (e.g., a separate component coupled to the beds, or may be integral within the beds). Further, in some embodiments, the receiving connector 530 may be configured to be operatively coupled to the extension connector 520.

Figure 23A:
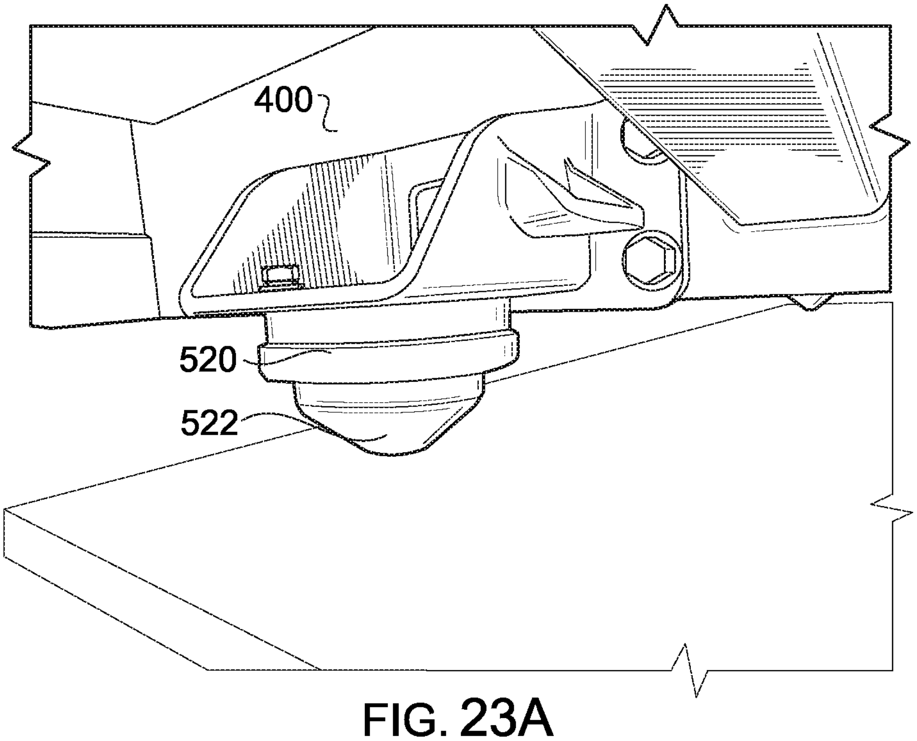
FIG. 23A is a perspective view of the extension connector operatively coupled to the bed, in accordance with some embodiments of the present disclosure.
Figure 23B:
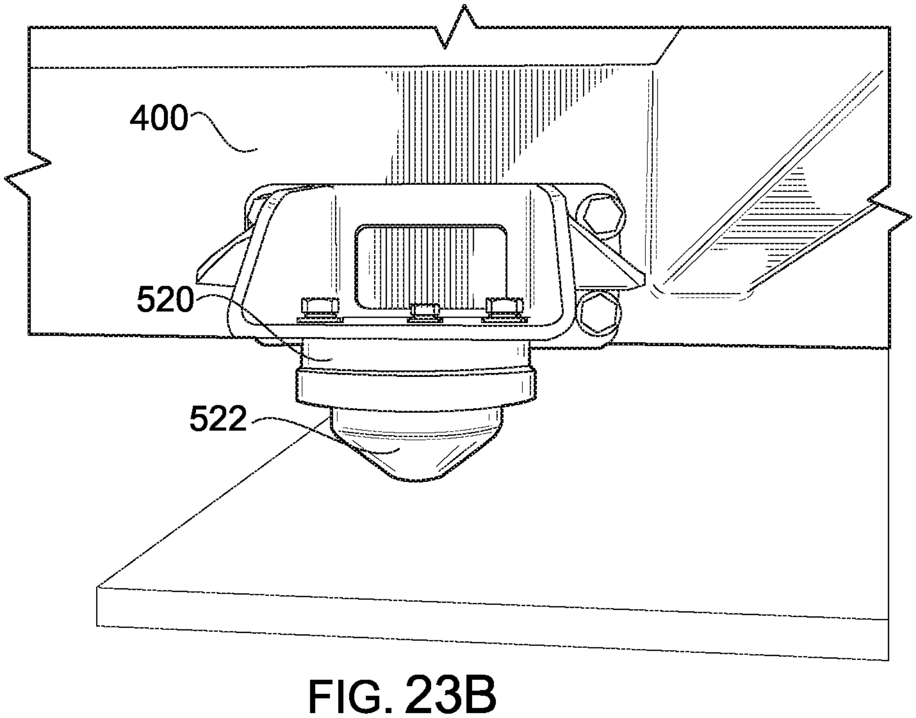
FIG. 23B is a perspective front view of the extension connector operatively coupled to the bed, in accordance with some embodiments of the present disclosure.
Figure 24:
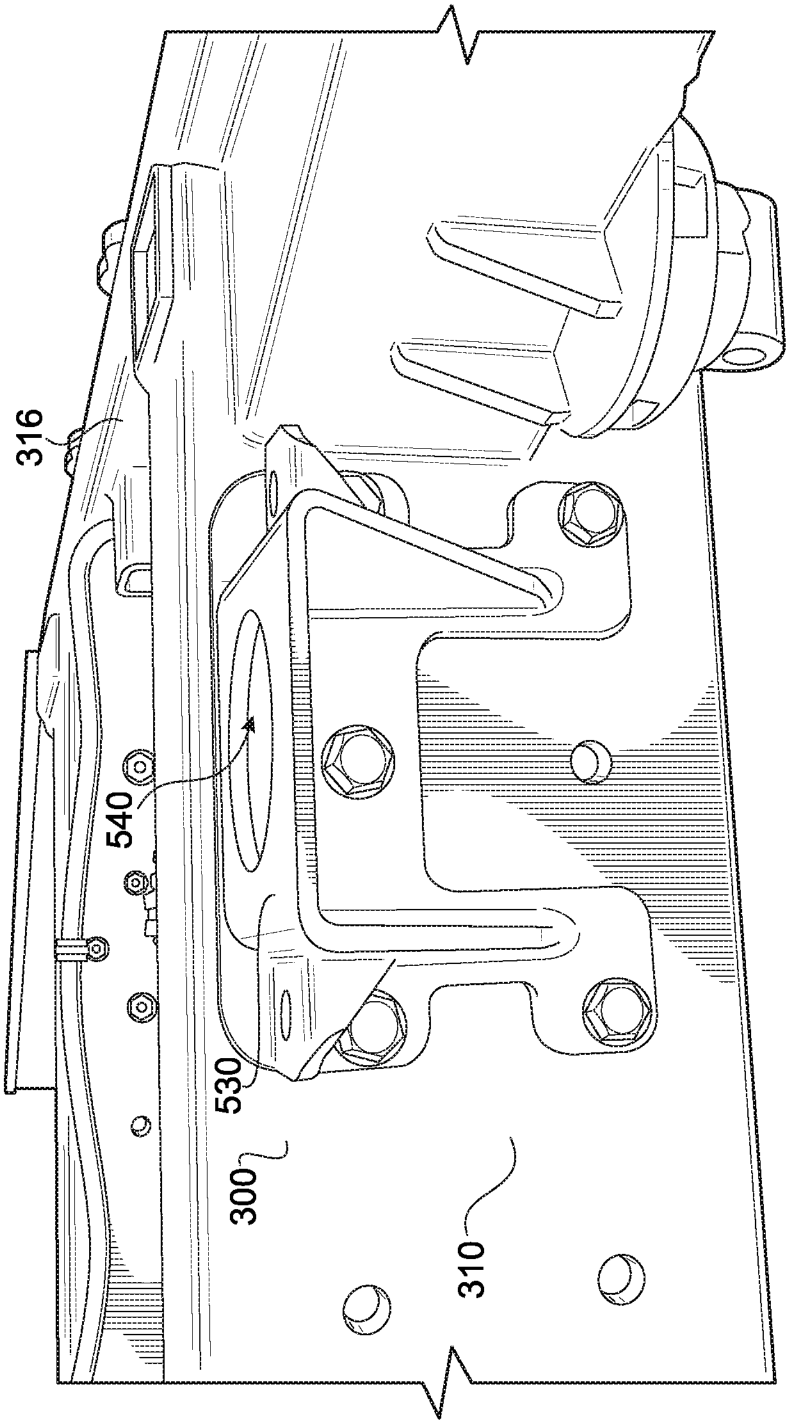
FIG. 24 is a perspective view of the receiver connector operatively coupled to the frame, in accordance with some embodiments of the present disclosure.

In some embodiments, the extension connector 520 with the projection 522 may be operatively coupled to the bed 400, and the receiving connector 530 forming the connector aperture 540 may be operatively coupled to the frame 300. For example, and as shown in FIGS. 9 and 24 the receiving connector 530 forming the connector aperture 540 is attached to the frame 300 (e.g., axial frame members 310), and as shown in FIG. 23, the corresponding extension connector 520 may be operatively coupled to the bed 400 for aligning the bed 400 to the frame 300. In some embodiments, the extension connector 520 may be coupled to the frame 300 and the receiving connector 530 forming the connector aperture 540 may be coupled to the bed 400. In still other embodiments, one or more extension connectors 520 may be coupled to both the frame 300 and the bed 400, while one or more opposing receiving connectors 530 may also be coupled to the frame 300 and the bed 400.

In some embodiments, once the bed 400 is coupled to the frame 300 via the receiving connector 530 receiving the extension connector 520, one or more connector couplings (e.g., fasteners, such as bolts 526 as illustrated, nuts, pins, dowels, or the like fastener, clamps, clips, or other like connectors) may be used to provide a force for securing the bed 400 to the frame 300. In some embodiments, the bolts 526 (or other connector coupling) may be inserted into receiving connectors apertures 532 first and then inserted into extension connector apertures 532. In some embodiments, the bolts 526 may include threads (not shown) which may correspond to threads of the apertures 524 and/or 532 (not shown). In this regard, the bolts 526 may be tightened to provide a force that is used to secure the bed 400 to the frame 300. In other embodiments, other types of fasteners, such as one or more pins 526 may be used that are inserted into the apertures 524 and 532. In some embodiments, a connector coupling may include a fastening mechanism (e.g., adjustable cam lock, clamp, or the like) that may provide the appropriate clamping force for securing the bed 400 to the frame 300.

In some embodiments, and as shown in FIG. 27, a method for interchanging a bed 1000 for the vehicle 100 is provided. As illustrated in block 1002, in some embodiments, the method may include removing an existing bed 400 from the frame 300, wherein removing the exiting bed from the frame includes decoupling the existing bed from the frame via decoupling the extension connector 520 from the receiving connector 530. In some embodiments, one or more connector couplings (e.g., clamps, clips, fasteners, such as bolts and nuts, pins, dowels, or other fasteners, or other types of connector couplings) may be used to operatively couple the extension connector 520 and the receiving connector 530 to each other. As such, when removing a bed 400, the connector couplings may be disengaged (e.g., the fasteners may be removed, or the like). For example, the connector bolts 526 may be decoupled from the extension connector 520 and the receiving connector 530 prior to the bed 400 being removed from the frame 300.

FIG. 27 further illustrates that that the bed 400 may be lifted off of the frame 400 by one or more users (e.g., personal, or the like) in the field. As shown in block 1004, and in some embodiments, the method may include removing the bed from the frame, such as by lifting the bed (vertically) and moving the bed and/or vehicle (horizontally). Further, in some embodiments, the bed may be lifted and/or moved (e.g., manually by one or more users in the field, or partially automatically through one or more bed support assemblies (e.g., storage posts, jacks, or the like), which may be adjustable such that a single user may be able to raise the bed. The one or more users may remove the bed 400 manually; however, depending on the weight of the bed 400, one or more bed support assemblies, such as jacks (e.g., pneumatic, mechanical, or the like jacks) may be placed under a portion of the beds 400 (e.g., four jacks adjacent each corner, two jacks on opposing ends or opposing sides of the bed), and the jacks may be used to lift the bed 400.

The one or more jacks may be easily attached to the bed 400 through the use of one or more jack connectors (e.g., tubular members, or the like) that are located on the bed 400, and which receive a projection from the jacks. It should be understood that the jacks may have a projection, such that the projection is inserted into the jack connector, which also allows the jack to be at least partially offset from frame 300 or other components of the vehicle 100, and/or from the bed 400. For example, the jack connector may be a jack connector 404, as shown in FIGS. 25 and 28. In this regard, one or more jacks 402 may be inserted into the jack connector 404 while the bed 400 is on the vehicle 100. The jacks 402 may then be used to raise the bed 400 from the vehicle 100. In some embodiments, users may then move the bed 400 horizontally away from the vehicle 100. In some embodiments, the users may manually move the bed 400. In other embodiments, the bed 400 may be raised high enough from the frame 300 so that the vehicle 100 may drive out from under the bed 400 without the bed 400 needing to be moved. In some embodiments, the jacks 402 may store the bed 400 at a designated height so that the vehicle 100 may reverse under the bed 400 and the bed 400 may be lowered onto the frame 300. In some embodiments, the jacks 402 may be equipped with wheels (not shown) or the like that allow the jacks 402 to be moved while attached to the bed 400. In this regard, once the bed 400 is loaded onto the jacks 402, the bed 400 may then be rolled or otherwise transported to a different location using the wheels of the jacks 402. The one or more jacks 402 may be stored on site or may be stored on the vehicle (e.g., attached to the frame 300, within a bed 400, or the like). Regardless of whether or the bed 400 may be removed manually or at least partially using jacks 402, the bed 400 may be quickly decoupled from the frame 300. Moreover, while the beds 400 have been described as being assembled and/or disassembled to the frame specifically through the use of jacks 402, it should be understood that any type of bed support assembly may have the same or similar types of features as the jacks that allow for the assembly and/or disassembly of the beds from the frame of the vehicle.

Further, in some embodiments, as illustrated by block 1006, the method may include installing an alternate bed to the frame wherein the receiving connector receives at least a portion of the extension connector. In this way, an alternate bed 400 may be quickly installed onto the frame 400, in the same or similar way as the installed bed 400 was removed. That is, users may lift an alternate bed 400, manually or through the use of the jacks 402, and move the bed 400 over the frame 300 (or drive the vehicle under the lifted bed 400). Thereafter, the bed 400 may be lowered (manually or through the use of the one or more jacks 402) towards the frame 300.

Additionally, or alternatively, an overhead crane (e.g., static crane, moveable crane), forklift, A-frame hoists, hydraulic lifts, pallet jacks, shop cranes, skid steer loaders, tractors, winch systems, screw-lift systems, mechanical lift systems, or other type of machinery may be used to assemble and/or disassemble the bed 400 from the frame of the vehicle.

In some embodiments, installing the alternate bed 400 through the one or more self-locating connectors comprises receiving the projection of the extension connector within the connector aperture of the receiving connector. In this regard, the self-locating connector 510 may aid in locating (or aligning) the bed 400 with the frame 300, such as through the projection 522 of the extension connector 520 being received within an aperture 540 of the receiving connector 530. In some embodiments, when the extension connector 520 is attached to the bed 400 and the receiving connector 530 is attached to the frame 300, the projection 522 will be lowered into the aperture 540. In other embodiments where the receiving connector 530 is attached to the bed 400 and the extension connector 520 is attached to the frame 300, the aperture 540 will be lowered over the projection 522. Once the bed 400 is located over the frame 300, the connector couplings (e.g., bolts 526, or other connector couplings) may be engaged to hold the self-locating connector 510 together, and thus, the bed 400 to the frame 300.

It should be understood that method for interchanging the bed 400 of the vehicle 100 may be completed in 5 minutes, 10 minutes, 15 minutes, 20 minutes, 25 minutes, 30 minutes, 35 minutes, 40 minutes, 45 minutes, 50 minutes, 55 minutes, 60 minutes, 70 minutes, 80 minutes, 90 minutes, 100 minutes, 110 minutes, or 120 minutes (or otherwise range between, overlap, or fall outside of any of these values). Further, in some embodiments, the method may be completed using one person, two people, three people, four people, or the like. In particular embodiments, the method may be completed by two people in less than 30 minutes. Additionally, or alternatively, in some embodiments, while equipment may be used to assemble and/or disassemble the bed 400, the method of the present disclosure may be completed without the assistance of large industrial equipment, such as a crane, heavy equipment, or the like.

In some embodiments, a modular bed connector system for a vehicle may include an extension connector (e.g., the extension connector 520) coupled to a frame (e.g., the frame 300) or a modular bed (e.g., the bed 400). In some embodiments, the modular bed connector system may include a receiving connector (e.g., the receiving connector 530) operatively coupled to the frame 300 or the modular bed 400. In some embodiments, the modular bed connector system may include a self-locating mechanism (e.g., the self-locating connector 510) which may include a projection (e.g., the projection 522) on the extension connector 520 and surfaces of the receiving connector forming a connector aperture. In some embodiments, the projection may be configured to be received within the connector aperture to facilitate alignment of the bed 400 to the frame 300 during installation. In some embodiments, the modular bed connector system may include one or more connector bolts configured to provide a force that secures the bed 400 to the frame 300. In some embodiments, the modular bed 400 connector system may allow for customizability and interchangeability that enables removal and replacement of the modular bed 400 with an alternate bed 400. In some embodiments, the interchangeability may allow the beds 400 to be replaced without damaging or otherwise permanently altering either the frame 300, the bed 400, the alternate bed 400, or the vehicle 100.

The vehicle 100 of the present disclosure, and in particular, the features of the vehicle 100 discussed herein, provide improvements over traditional vehicles, and in particular traditional offroad vehicles. Offroad vehicles are designed to traverse various types of terrain that are typically inaccessible to standard road vehicles. These terrains include but are not limited to rocky paths, sandy landscapes, muddy trails, snow-covered paths, mountainous landscapes, paths covered in rubble, or the like. Challenges are associated with designing a vehicle that may be utilized on constructed paths (e.g., paved roads, or the like) and/or offroad terrains, and provides improved capabilities (e.g., performance standards, customization, and/or modular interchangeability) while maintaining the safety of its occupants and performing as intended. Use of offroad vehicles for different applications, such as search and rescue, exploration, recreation, aid, police, military, or the like may have deployment requirements that define the envelope of the vehicle. Further, vehicles designed for military operations have the additional requirements of performing at military-grade levels. Requirements for military vehicles are often more stringent and demanding than private-level, civilian-level, commercial-level, or otherwise non-military-level vehicles.

The vehicle 100 disclosed herein provides additional ground clearance above a surface on which the vehicle 100 travels through the design of the lower control arm 200. The additional clearance provided by the lower control arm 200 may allow the vehicle to traverse terrain previously inaccessible to vehicles with conventional control arms. In this way, the improved vehicle 100 may be able be deployed in areas in which traditional vehicles may not be able to be deployed. Further, during deployment and operation of the vehicle 100, the additional clearance of the lower control arm 200 allows for more effective use of the vehicle 100. In this way, the vehicle 100 may be used in a greater number of situations throughout the vehicle's 100 operational life. Additionally, or alternatively, the additional lift (e.g., surface clearance) of the vehicle will reduce redundancies associated with maintaining other support vehicles nearby. In this way, the vehicle's 100 capability to traverse rough terrain translates to the lack of need for support vehicles, rescue vehicles, maintenance vehicles, and the like. In other words, the support requirements that are typically required for vehicles with conventional control arms may not be needed for the vehicle 100.

In particular applications, the vehicle provides adaptability while maintaining functionality, in particular for military grade vehicles in order to meet mission-critical functionality. For instance, deployment of vehicles from aircraft (e.g., helicopters, cargo planes, or the like), and in particular military aircraft, must meet certain envelope requirements (e.g., width, length, height, or the like) to fit within the aircraft. In some instances, the vehicle's width is sized to meet certain with requirements (e.g., the cargo space width of the aircraft, use on particular roads within offroad terrain, within a city with narrow roads, or the like). As such, the width of the vehicle may be 70, 72, 74, 76, 78, 80, 82, 84, 86, 88, 90, 90, or 100 inches (or range between, overlap, or fall outside of any of these values). In addition to the envelope requirements, the vehicle is also able to meet performance standards (e.g., mission standards, or the like), such as a minimum ground clearance, resistance to rolling over while driving over offroad terrain. Conventionally, when a vehicle is raised and the width (e.g., wheelbase) of the vehicle is reduced, the camber gain increases, causing the contact patch (e.g., the patch of the tire in contact with the surface beneath the vehicle) to be reduced. An increase in camber gain, and subsequent reduction in contact patch, significantly increases the chance of the vehicle becoming unstable during operation of the vehicle (e.g., due to the reduced contact with the ground over which the vehicle is traveling). The vehicle 100 of the present disclosure allows for an improved width (i.e., a reduced width), while restricting (e.g., reducing or eliminating) the camber gain concerns.

In particular embodiments, the vehicle 100 of the present disclosure is customizable (e.g., due at least in part to the component mounting apertures 340) to allow the different types of components to be utilized in order to produce customized vehicles for different applications. As such, the vehicle 100 of the present disclosure allows for the connection of different components, such as different drive trains, suspensions, engines, sensors, equipment to assemble vehicles for different purposes.

Additionally, the vehicle 100 of the present disclosure is adaptable based on changing conditions, such as environmental, situational, operational, or the like conditions. For example, the vehicles may require adaptability for people transport, cargo transport (e.g., oversized loads, fragile cargo, light loads, heavy loads, or the like), projectile protection using armor, short-distance transport, long-distance transport, or the like. In particular applications, such as military applications, the vehicle 100 is able to meet mission variation standards during deployment and operation. For example, if a vehicle is stationed at a Forward Operating Base (FOB), the vehicle must be able to quickly adapt to unscheduled and rapidly evolving conditions. In this way, a vehicle stationed at a FOB may need to be adapted to provide fuel, water, weapons systems, medical aid, technological intervention (e.g., deployment of communication operations, or the like), personal deployment, or the like for a surrounding area. Conventionally, to change a vehicle's functionality (if possible, at all) requires a crane, lifting system, or otherwise large equipment to switch out vehicle components for different conditions. Using a crane to swap the vehicle's functionality is a slow and dangerous process, especially if the vehicle is deployed at an FOB or "hot zone."

While a crane or other equipment may be used to assemble and/or disassemble the beds 400, this type of equipment is not required to change the modular beds 400. That is, the vehicle 100 of the present disclosure allows the beds 400 to be interchanged quickly and easily with little to no heavy equipment, and thus the vehicle's functionality to be changed, quickly and easily. The case of the vehicle's adaptation allows for the vehicle 100 to be an effective and efficient solution for operational military-grade vehicles or other applications that require the adaptability for changing conditions (e.g., situational, environmental, operational, or the like). Further, the method to interchange the beds 400 from the vehicle 100 may be performed with relatively few resources as compared to conventional vehicle changeouts.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and should not be interpreted in an idealized or overly formal sense unless expressly so defined herein. Certain terminology is used herein for convenience only and is not to be taken as a limitation on the invention. For example, words such as "upper," "lower," "left," "right," "horizontal," "vertical," "upward," and "downward" merely describe the configuration shown in the figures. The referenced components may be oriented in an orientation other than that shown in the drawings and the terminology, therefore, should be understood as encompassing such variations unless specified otherwise.

It will be understood that when an element is referred to as being "connected," "coupled," or "operatively coupled" to another element, the elements can be formed integrally with each other, or may be formed separately and put together. Furthermore, "connected," "coupled," or "operatively coupled" to can mean the element is directly connected, coupled, or operatively coupled to the other element, or intervening elements may be present between the elements. Furthermore, "connected," "coupled," or operatively coupled" may mean that the elements are detachable from each other, or that they are permanently coupled together.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A vehicle, comprising:

a frame, wherein the frame comprises one or more axial frame members, wherein the one or more axial frame members comprise:

one or more interior surfaces; and one or more exterior surfaces;

wherein the one or more interior surfaces form one or more recesses relative to the one or more exterior surfaces;

a plurality of suspension systems operatively coupled to the frame through mounts; wherein the mounts comprise a mounting bracket that is operatively coupled to the one or more interior surfaces within the one or more recesses;

a plurality of tire assemblies, wherein each tire assembly is operatively coupled to one of the plurality of suspension systems;

a propulsion system operatively coupled to one or more of the plurality of tire assemblies;

a cab operatively coupled to the frame;

and one or more beds operatively coupled to the frame.

2. The vehicle of claim 1, wherein the each of the plurality of suspension systems comprises:

a lower control arm, wherein the lower control arm is operatively coupled to a tire assembly and the frame, and wherein the lower control arm is configured to lift the vehicle above a surface by a lift height.

3. The vehicle of claim 2, wherein the lower control arm comprises:

a primary arm member; and an offset arm member operatively coupled to the primary arm member and operatively coupled to the tire assembly, wherein the offset arm member provides additional lift for the lift height.

4. The vehicle of claim 3, wherein the primary arm member and the offset arm member form an approximately L-shaped lower control arm.

5. The vehicle of claim 2, wherein the lower control arm comprises a clearance channel, wherein the clearance channel allows a rotating member or a rotating member housing operatively coupled to the tire assembly to operate without interference from the lower control arm.

6. The vehicle of claim 1, wherein the one or more axial frame members comprise at least two axial frame members operatively coupled by one or more transverse frame members or the cab.

7. The vehicle of claim 1, wherein the mounting bracket operatively coupled to the one or more interior surfaces within the one or more recesses reduces the width of the vehicle.

8. The vehicle of claim 1, wherein the frame further comprises a plurality of component mounting apertures extending longitudinally along the one or more axial frame members, and wherein the component mounting apertures are configured to provide alternate mounting locations for vehicle components.

9. The vehicle of claim 1, further comprising:

a bed connector system comprising one or more self-locating connectors, wherein the self-locating connectors are configured to operatively couple the one or more beds to the frame.

10. The vehicle of claim 9, wherein the one or more self-locating connectors comprise:

an extension connector operatively coupled to the frame or the one or more beds; and a receiving connector operatively coupled to the other of the frame or the one or more beds;

wherein the receiving connector is configured to be operatively coupled to the extension connector.

11. The vehicle of claim 10, wherein the extension connector comprising a connector projection, wherein the receiving connector has surfaces forming a connector aperture, and wherein the connector aperture receives the projection of the extension connector.

12. The vehicle of claim 1, wherein the one or more beds comprise a plurality of interchangeable modular beds.

13. The vehicle of claim 12, wherein the plurality of interchangeable modular beds comprise:

a flatbed module;

a fluid tank supply module;

a seated transport module;

a truck bed module;

a medical assistance module; or a weapons module.

14. The vehicle of claim 1, wherein the propulsion system comprises:

a powertrain comprising an engine, a transmission, and drive shafts.

15. A modular bed connector system for a vehicle, comprising:

an extension connector operatively coupled to a frame or a bed;

a receiving connector operatively coupled to the other of the frame or the bed;

a self-locating mechanism comprising:

a projection on the extension connector; and the receiving connector comprising surfaces forming a connector aperture;

wherein the projection is configured to be received within the connector aperture to facilitate alignment of the bed to the frame during installation; and one or more connector bolts configured to provide a force that secures the bed to the frame.

16. A vehicle, comprising:

a frame, wherein the frame comprises one or more axial frame members having a plurality of component mounting apertures extending longitudinally along the one or more axial frame members, and wherein the plurality of component mounting apertures are configured to provide alternate mounting locations for vehicle components;

a plurality of suspension systems operatively coupled to the frame through mounts;

a plurality of tire assemblies, wherein each tire assembly is operatively coupled to one of the plurality of suspension systems;

a propulsion system operatively coupled to one or more of the plurality of tire assemblies;

a cab operatively coupled to the frame; and one or more beds operatively coupled to the frame.

* * * * *